United States Patent
Kim et al.

(10) Patent No.: US 7,311,366 B2
(45) Date of Patent: Dec. 25, 2007

(54) CASE FOR PORTABLE DISPLAY DEVICES

(75) Inventors: Si Han Kim, 338-1, Daessangyong-Ri, Choweol-Myun, Kwangju-Kun, Kyunggi-Do (KR) 464-862; Yang Ho Kim, Kyunggi-Do (KR); Hung Nyun Kim, Seoul (KR)

(73) Assignee: Si Han Kim, Kyunggi-Do (KR)

( * ) Notice: Subject to any disclaimer, the term of this patent is extended or adjusted under 35 U.S.C. 154(b) by 0 days.

(21) Appl. No.: 11/363,330

(22) Filed: Feb. 27, 2006

(65) Prior Publication Data

US 2006/0138913 A1    Jun. 29, 2006

Related U.S. Application Data

(62) Division of application No. 10/049,011, filed on Feb. 5, 2002, now Pat. No. 7,032,984.

(30) Foreign Application Priority Data

| Aug. 9, 2000 | (KR) | ................. 2000-46129 |
| Oct. 13, 2000 | (KR) | ................. 2000-60316 |
| Nov. 3, 2000 | (KR) | ................. 2000-65106 |
| Dec. 6, 2000 | (KR) | ................. 2000-34125 |
| Mar. 14, 2001 | (KR) | ................. 2001-13075 |
| Mar. 20, 2001 | (KR) | ................. 2001-14308 |
| Mar. 26, 2001 | (KR) | ................. 2001-15553 |

(51) Int. Cl.
*A47B 81/06* (2006.01)
*A47B 81/00* (2006.01)

(52) U.S. Cl. .............. 312/7.2; 312/223.2; 49/383

(58) Field of Classification Search ............ 312/7.2, 312/223.1, 223.2; 16/251; 49/383; 349/5, 349/8, 60; 345/1.3, 1.1, 905
See application file for complete search history.

(56) References Cited

U.S. PATENT DOCUMENTS

| 1,263,895 | A | | 4/1918 | Hubbard |
| 1,444,398 | A | | 2/1923 | Sheperd |
| 1,626,844 | A | * | 5/1927 | Kuhn ....................... 160/229.1 |
| 2,481,877 | A | | 9/1949 | Rhodes |
| 3,399,782 | A | | 9/1968 | Bascom |
| 4,850,143 | A | | 7/1989 | Crooimans .................. 49/383 |
| 4,856,141 | A | | 8/1989 | Sassenberg .................. 16/250 |
| 5,001,862 | A | | 3/1991 | Albenda ...................... 49/383 |
| 5,126,725 | A | * | 6/1992 | Yanagisawa ................ 345/168 |
| 5,128,662 | A | * | 7/1992 | Failla ......................... 345/1.3 |

FOREIGN PATENT DOCUMENTS

| JP | 5-30918 | 4/1993 |
| JP | 5-197444 | 8/1993 |

*Primary Examiner*—Janet M. Wilkens

(57) ABSTRACT

A case for a portable display device can realize a large-sized screen by interconnecting a plurality of display elements. When the display elements are unfolded, the adjacent sides of the display elements closely contact each other, thereby minimizing the non-display area. When the display elements are folded, the outer surface of the display elements can be protected. The case includes a foldable panel housing receiving at least two flat display panel elements. The panel housing is provided with an opening such that when the panel housing is unfolded, the adjacent sides of the flat display elements closes contact each other. The case further includes a hinge supporting member for providing the folding/unfolding operation of the panel housing and a cover for covering a side of the flat display elements, which is exposed through the opening, to protect the display elements.

11 Claims, 29 Drawing Sheets

U.S. PATENT DOCUMENTS

| | | |
|---|---|---|
| 5,220,708 A | 6/1993 | Lucas et al. .................. 16/225 |
| 5,467,102 A | 11/1995 | Kuno et al. ..................... 345/1 |
| 5,734,513 A * | 3/1998 | Wang et al. ................ 359/742 |
| 5,778,601 A | 7/1998 | Wu ............................. 49/383 |
| D397,998 S | 9/1998 | Ambroe .................... D14/113 |
| 6,107,988 A | 8/2000 | Phillipps .................... 345/156 |
| 6,229,502 B1 * | 5/2001 | Schwab ...................... 345/1.1 |
| 6,262,785 B1 * | 7/2001 | Kim ............................ 349/58 |
| 6,298,605 B1 | 10/2001 | Delefosse et al. ............ 49/383 |
| 6,421,235 B2 | 7/2002 | Ditzik ........................ 361/683 |
| 6,930,881 B2 * | 8/2005 | Karidis et al. .............. 361/683 |
| 6,970,210 B2 * | 11/2005 | Kim et al. ..................... 349/58 |
| 2003/0189759 A1 * | 10/2003 | Kim et al. ................... 359/619 |
| 2005/0054395 A1 * | 3/2005 | Arbisi et al. ............. 455/575.3 |
| 2005/0248501 A1 * | 11/2005 | Kim ........................... 345/1.1 |
| 2006/0197714 A1 * | 9/2006 | Chang ........................ 345/1.1 |
| 2007/0028418 A1 * | 2/2007 | Kilpinen ...................... 16/286 |

* cited by examiner

US 7,311,366 B2

CASE FOR PORTABLE DISPLAY DEVICES

TECHNICAL FIELD

The present invention relates to a multi-information display device that can realize the large-sized screen by connecting plural display elements, and more particularly to a fordable case for a portable display device that can minimize the non-display area by disposing adjacent display elements such that the adjacent walls of the display elements are arranged on an identical line when the device is unfolded and that can protect sidewalls of display elements, which are exposed outside when the device is folded.

BACKGROUND ART

In recent years, as the portable information device has been developed, it has been possible for a user to connect to the network and to computing-work using a portable computer, a digital portable communication device and other periphery devices regardless of where the user is.

Accordingly, the use of the portable information devices is gradually increased. Therefore, it is required to reduce the size, weight, thickness of a variety of information devices such as mobile phones, e-books, portable computers and personal digital assistants (PDA) considering the mobility of the systems.

However, as the size of the portable information device is reduced, although the mobility and portability of the device are improved, the screen size for displaying the information is reduced.

Accordingly, a display device that is designed to display a large amount of information by making the utmost use of the reduced screen size while satisfying the mobility and portability has been developed.

As an example, a multi-information display device having plural display elements connected to be adjacent to each other to realize the large sized screen for displaying a large amount of information.

As the display elements used in the multi-information display device, a liquid crystal display (LCD), a thin film transistor (TFT)-LCD, a field emission display (FED), a plasma display panel (PDP), and an electro luminescent (EL) are usually used.

However, the adjacent sidewalls of the display elements of the prior art are not exactly arranged on an identical line and the periphery surfaces in the vicinity of the adjacent sidewalls are enclosed by a housing (or a case), defining the non-display areas. The non-display areas in the vicinity of the adjacent sidewalls make the screens of the display elements is seen to be divided, deteriorating the display quality of the device.

As another embodiment, a foldable information display device having two cases receiving flat display elements foldable on each other. However, in the foldable information display, the flat display elements are closely arranged to reduce the non-display area when the device is unfolded, as a result of which the adjacent portions of the elements are exposed outside when the cases are folded on each other, thereby easily damaging the devices by outer shock.

DISCLOSURE OF INVENTION

The present invention has been made in an effort to solve the above described problems.

It is an objective of the present invention to provide a case for a portable display device that can minimize the non-display area by disposing adjacent display devices such that the adjacent walls of the display elements are arranged on an identical line when the device is unfolded and that can protect sidewalls of display elements, which are exposed outside when the device is folded, It is another objective of the present invention to provide a fordable display device that is designed to cover adjacent portions of flat panel display elements that are exposed outside when the device is folded, thereby protecting the device from being damaged.

To achieve the above objectives, the present invention provide a case for a portable display device, comprising a foldable panel housing receiving at least two flat panel display elements, the flat panel display elements having adjacent sidewalls contacting each other when the panel housing is unfolded; a folding support member for supporting a folding operation of the panel housing; and cover means for covering the adjacent sidewalls of the flat panel display elements when the panel housing is folded.

The panel housing includes an opening defined by cutting the sidewalls, the opening being designed such that the adjacent sidewalls of the flat panel display elements contact each other when the panel housing is unfolded.

The cover means is mounted on the folding part of the panel housing. And the cover means is operated to a location where the cover means dose not interfere the contact of the adjacent sidewalls of the flat panel display elements when the panel housing is unfolded.

The panel housing is provided with a space in which the cover means is received when the panel housing is folded, the space being located on an inner or outer side of the panel housing.

The case may further comprises fixing means for fixing the cover means, the fixing means being an elastic member. The cover means may further comprises shock-absorbing means mounted on an inner surface of which.

The folding support member includes a hinge mounted on a rotational center of the panel housing. And the folding support member includes two rotational bars one ends of which is coupled to the panel housing and a rotational shaft on which each of the other ends of the rotational bars are fixed.

The cover means comprises a center cover for covering the sidewalls of the flat panel display elements and bendable side covers extending from both sides of the center cover, the center cover being received in a shelter formed on the panel housing when the panel housing is unfolded.

A flexible connecting member is disposed between the center cover and the side covers.

The cover means may further comprises a hinge shaft projected from the side covers and coupled to the panel housing. And the cover means may further comprises a cover mounted on upper and lower portion of the center cover.

The case may further comprises cover-folding means for folding the cover means to the shelter when the panel housing is folded and unfolded.

The cover-folding means comprises an elastic member coupled between an inner wall of the shelter and the side covers. The cover-folding means comprises a stopper for preventing the side covers from rotating outward. And the cover-folding means comprises a guide projection formed on the side covers and a guide groove for guiding an inward rotation of the guide projection to the shelter.

According to another embodiment of the present invention, the cover means is designed to be flexible and received in a shelter of the panel housing, the shelter receiving the cover means so that the cover means is not exposed outside when the panel housing is unfolded.

The cover means comprises a center cover for covering the sidewalls of the flat panel display elements, side covers connected to both sides of the center cover by connecting portions, and a hook step formed on one ends of the side covers.

The case may further comprise an elastic member connected between an inner wall of the shelter and the hook step.

The cover means may be formed of plural unit covers between which connecting portions are disposed such that the cover means is bendable. And the cover means may be formed of a flexible sheet.

The cover means may further comprises a mounting part mounted on upper and lower portions of the center cover and a longitudinal groove formed on the mounting part, the folding support member being provided with a shaft projection coupled to the longitudinal groove.

The case may further comprises a finalizing part formed on the panel housing to enclose the mounting part.

According to still another embodiment of the present invention, the cover means comprises first and second unit covers flexibly connected by a connecting part, the first unit cover being fixed on a panel housing, and the second unit cover being received in a shelter.

The cover means comprises a hinge shaft mounted on the first unit cover, the hinge shaft being inserted into a groove formed on the panel housing, the panel housing is provided with a hook portion for preventing the hinge shaft from moving away.

Alternatively, the both ends of the cover means are rotatably coupled on the panel housing to cover the opening when the panel housing is folded.

The cover means may be formed of flexible sheet, one end of which is fixed inside a panel housing and the other end of which is mounted on the other panel housing with an elastic member interposed.

The cover means is attached on the inner surface of a panel housing.

The one end of the cover means connected to the elastic member is received in the shelter.

According to still another embodiment of the present invention, the cover means is designed to be extended when the panel housing is folded and to be shrunken when the panel housing is unfolded. That is, the cover means is formed in a bellows-shape.

The cover means comprises a coupling part fixed on an inner surface of the sidewall of the panel housing and a bellows part. In addition, the cover means may further comprise a protecting cover for covering upper and lower portions of the cover means.

The cover means is formed of a material selected from the group consisting of fabric and synthetic resin.

The protecting cover comprises a coupling member coupled to the folding support member, a holder coupled to the coupling member and connected to the bellows part, and a cover for covering the holder.

According to still another embodiment of the present invention, the cover means is formed of plural unit covers slidably connected to each other.

The case may further comprises a shelter for receiving the cover means when the panel housing is unfolded. The shelter is formed on the sidewall of the panel housing.

The cover means comprises first and third covers each having a sliding groove, a second cover having a sliding projection slidably inserted into the sliding grooves, and a bendable connecting part extending from the first and third covers and rotatably coupled to the panel housing.

The cover means may further comprises a mounting part formed on upper and lower portions of the second cover and a longitudinal groove formed on an inner surface of the mounting part and coupled to a shaft projection of the folding support member.

According to still another embodiment of the present invention, the case may further comprises sliding guide means for guiding the cover means behind the folding part of the panel housing when the panel housing is unfolded.

The cover means comprises a cover body for covering the opening of the panel housing and the sidewalls of the flat panel display elements and a mounting part formed on upper and lower portions of the cover body. And the cover means further comprises a guide wall enclosing the sidewall of the panel housing to prevent the panel housing from inadvertently unfolding.

The mounting part is provided with a longitudinal groove in which a shaft projection of the folding support member is coupled.

The sliding guide means comprises a longitudinal groove formed on the mounting part and a shaft projection formed on the folding support member and coupled to the longitudinal groove.

The sliding guide means is further provided with an incline groove formed on both sides of the longitudinal groove of the mounting part and a projection formed on the panel housing to correspond to the inclined groove.

According to still another embodiment of the present invention, the cover means is formed of a sheet cover so that it can be extended or shrunken by cover driving means when the panel housing is folded or unfolded.

The cover means comprises a concave portion and a convex portion.

The case may further comprise a shelter for receiving the cover means when the panel housing is unfolded. And the case may further comprise an elastic member disposed between one end portion of the cover means and an inner wall of the shelter.

The cover driving means comprises an elastic member connected to the other end portion of the cover means and the panel housing.

The cover driving means comprises a gear part formed on an outer circumference of a first cylinder of the folding support member connected to the panel housing, and idle and driving gears engaged with and driven by the gear part, the cover means being provided with concave and convex portions engaged with the driving gear.

The present invention will be described more in detail with reference to the accompanying drawings.

BEST MODE FOR CARRYING OUT THE INVENTION

Figure 1:
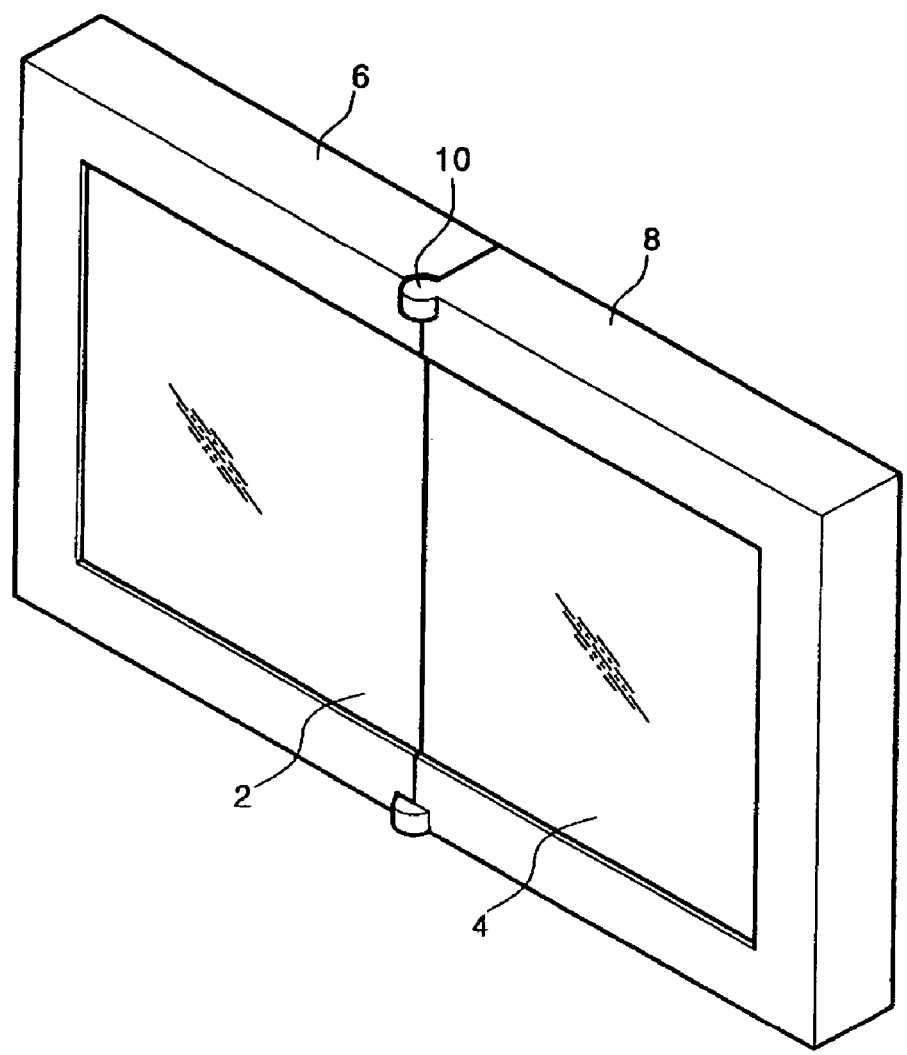
FIGS. 1 and 2 are perspective views illustrating a case for a portable display device according to a first embodiment of the present invention.

Preferred embodiments of the present invention will be described more in detail hereinafter.

First Embodiment

FIGS. 1 to 4 show a case for a portable display device according to a first embodiment of the present invention.

The inventive foldable case includes a pair of panel housings 6 and 8 for respectively receiving a pair flat display elements 2 and 4 and a folding support 10 for coupling the panel housings 6 and 8 such that the panel housings 6 and 8 can be folded on a same plane or at least 180°.

The flat display elements 2 and 4 are selected from the group consisting of an LCD, an FED, a PDP, and an EL including an organic EL.

The folding support 10 is preferably formed of a hinge assembly mounted on a border between the panel housings 6 and 8. The folding support 10 should be mounted on a rotational center of the panel housings 6 and 8 so that the adjacent sides of the flat panel elements 2 and 4 can be exactly located on the border between the flat panel elements 2 and 4.

In addition, to minimize the non-display area, the flat display elements 2 and 4 are designed to contact each other at their one side. To realize this, a portion of sidewalls of the panel housings 6 and 8 are cut away to define an opening 12.

At this point, the contacting sides of the flat display elements 2 and 4 are exposed through the opening 12 when they are folded on each other, cover means for preventing the contacting sides of the flat display elements 2 and 4 from being exposed is provided.

In this embodiment, the cover means 14 preferably includes a center cover 142 for covering sidewall openings 12 of the panel housings 6 and 8, and a side cover 146 extending from both sides of the center cover 142, foldably connected by a connecting member 144. A shelter 16 is formed on the panel housings 6 and 8 and houses the cover means 14 when the panel housings 6 and 8 are unfolded.

The side cover 146 is provided with a hinge shaft 148. And the hinge shaft 148 is coupled into a pin hole 18 formed on the shelter 16 of the panel housings 6 and 8 so that the cover means 14 can rotate in the shelter 16.

When the cover means 14 is formed of synthetic resins, the connecting member 144 is defined by a thin part of the cover means 14 so that it can be flexibly folded. When the cover means 14 is formed of metal or other hard materials, the connecting member 144 is defined by a hinge 150 (see FIG. 5). Accordingly, the cover means 14 is designed to be easily folded and received inside the shelter 16.

The shelter 16 is a space for receiving the cover means 14, being defined on a sidewall of the opening 12. That is, the shelter 16 receives the cover means 14 when the panel housings 6 and 8 are unfolded so that the cover means is not exposed outside (see FIG. 4).

Figure 3:
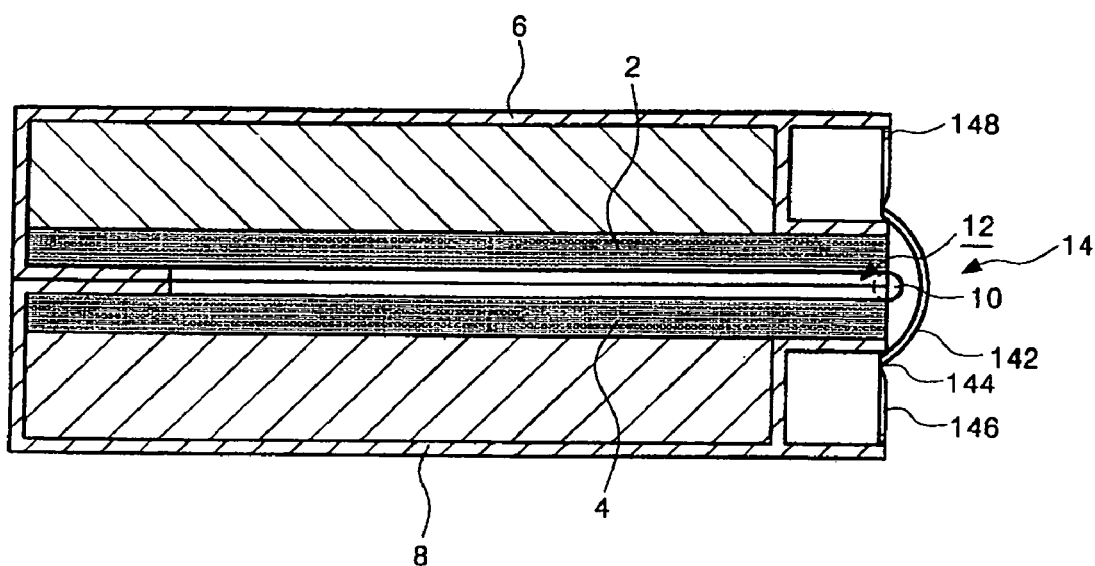
FIGS. 3 to 4 are sectional views illustrating the folding operation of the first embodiment.
Figure 4:
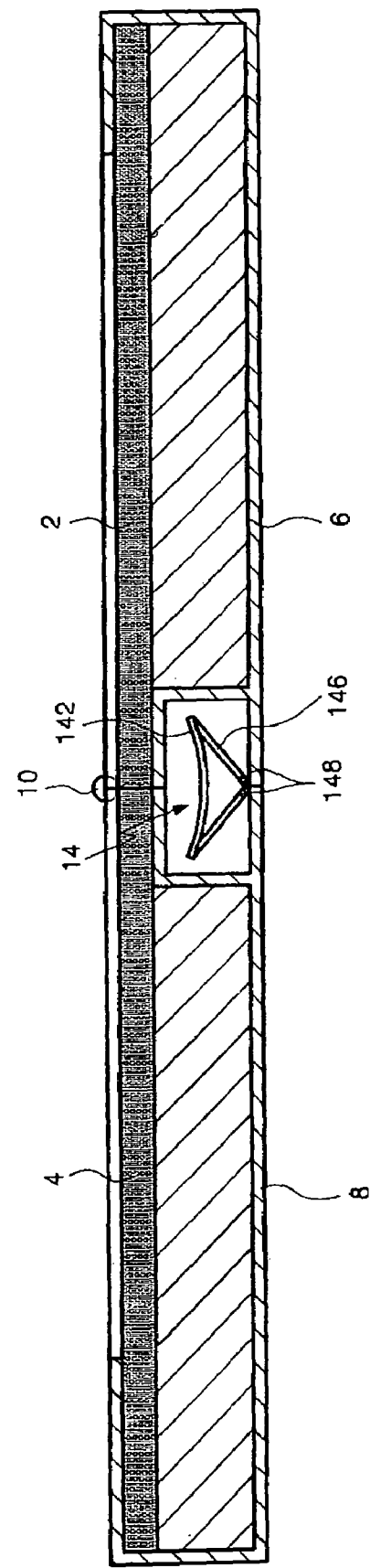

The cover means 14 covers the opening 12 when the panel housings 6 and 8 are folded (see FIG. 3), and is received in the shelter when the panel housings 6 and 8 are unfolded (see FIG. 4). In the present invention, cover-folding means for enhancing such an operation of the cover means is provided.

Figure 5:
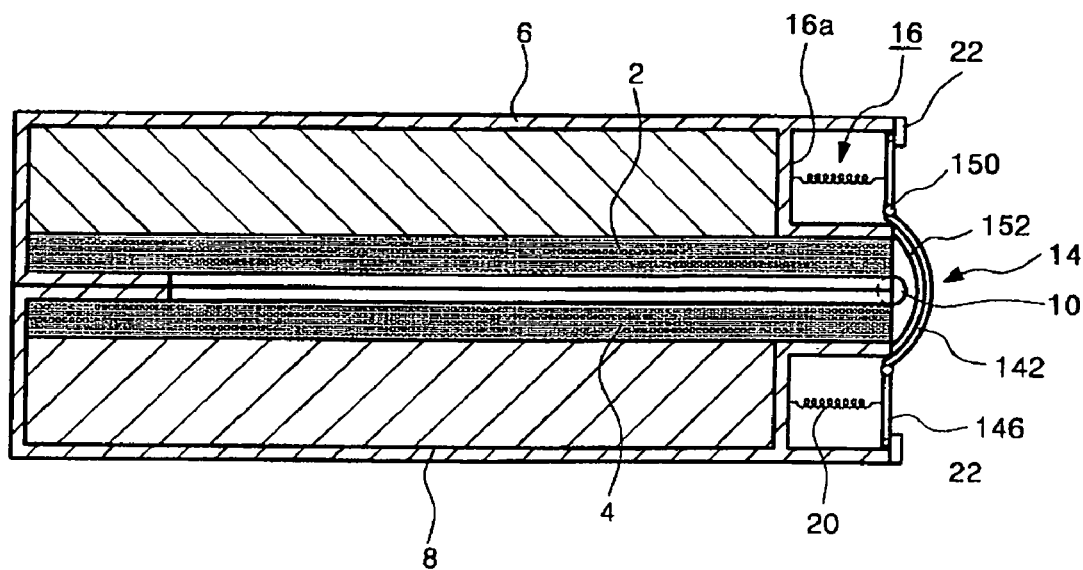
FIGS. 5 and 6 are respectively a sectional view and a perspective view illustrating cover-folding means of a case according to a first embodiment of the present invention.
Figure 6:
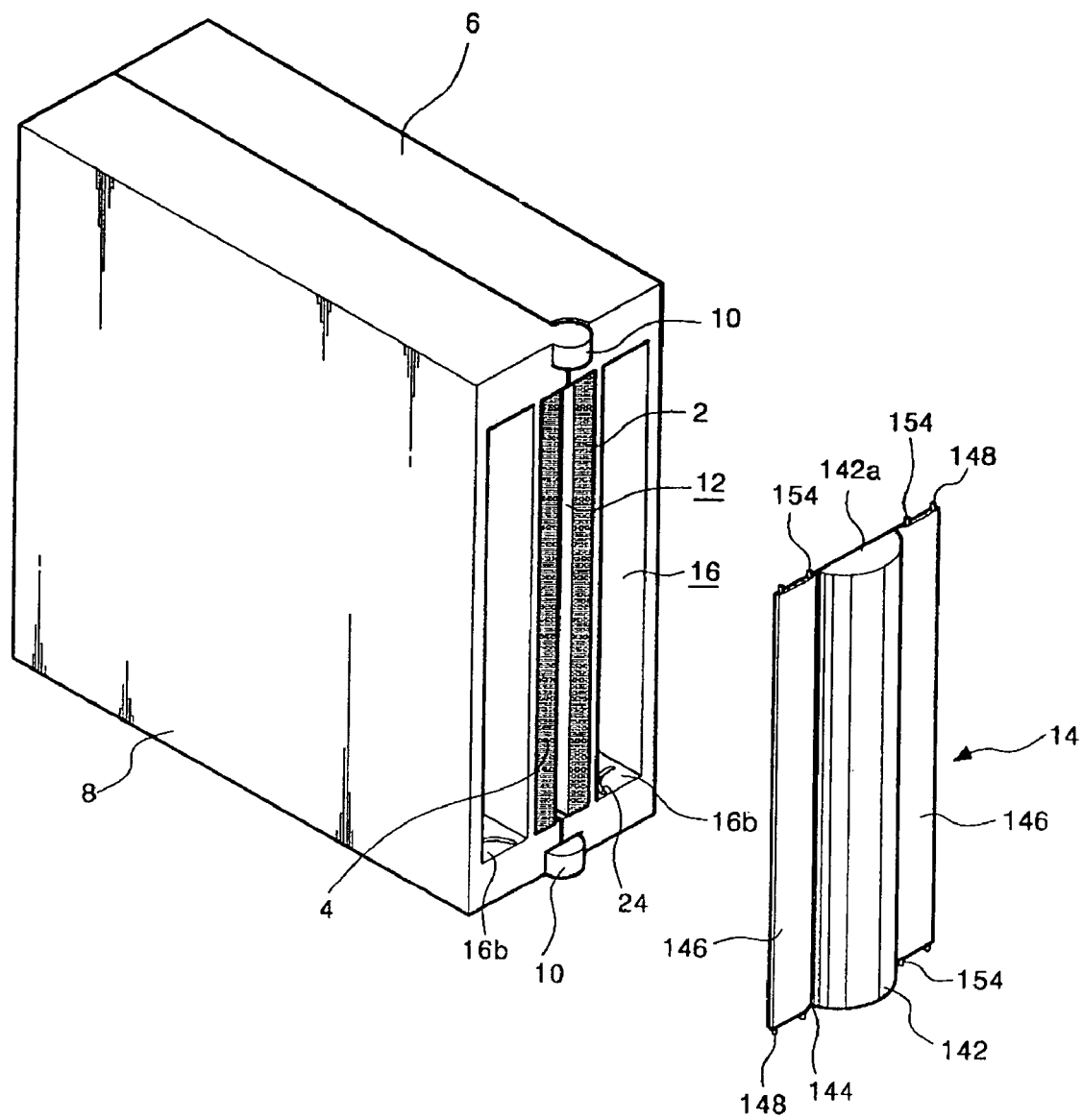

FIGS. 5 and 6 show preferred examples of the cover-folding means.

The cover-folding means shown in FIG. 5 is formed of an elastic member 20 disposed between the inner wall 16*a* of the shelter 16 and the side cover 146. The elastic member 20 biases the side cover 146 toward the inner wall 16*a* of the shelter 16 when the panel housings 6 and 8 are unfolded as shown in FIG. 4 so that the cover means 14 easily rotate around the hinge shaft 148 only in a direction toward the inside.

To prevent the cover means 14 from rotating in a direction toward the outside, stoppers 22 covering a part of the opening of the shelter 16 may be provided on the panel housings 6 and 8.

In addition, a shock-absorbing member 152 may be further mounted on an inner wall of the cover means 14 so as to prevent the cover means 14 from directly contacting the panel housings 6 and 8. As the shock-absorbing member 152, an elastic member such as a rubber, a sponge, or other elastic resins may be used. The shock-absorbing member 152 may be formed on an entire inner surface of the cover means 14 or on only the inner surface of the center cover 142.

The cover-folding means shown in FIG. 6 is defined by a guide projection 154 formed on the side cover 146 and a guide groove 24 formed on the upper and lower walls 16*b* of the shelter 16. The guide groove 24 guides the innerward rotation of the guide projection 154.

The guide projection 154 and the guide groove 24 functions as the stopper 22. That is, when the panel housings 6 and 8 are unfolded as shown in FIG. 4, they prevents the outward rotation of the side cover 146 while allowing for the innerward rotation, thereby realizing the receiving and rotating operation of the cover means 14 into the shelter 16.

To prevent the cover means 14 from being exposed outside when the center cover 142 is formed in an arc-shape, upper and lower covers 142*a* are further provided.

The operation of the above-described foldable case of the portable display device is described hereinafter.

Figure 2:
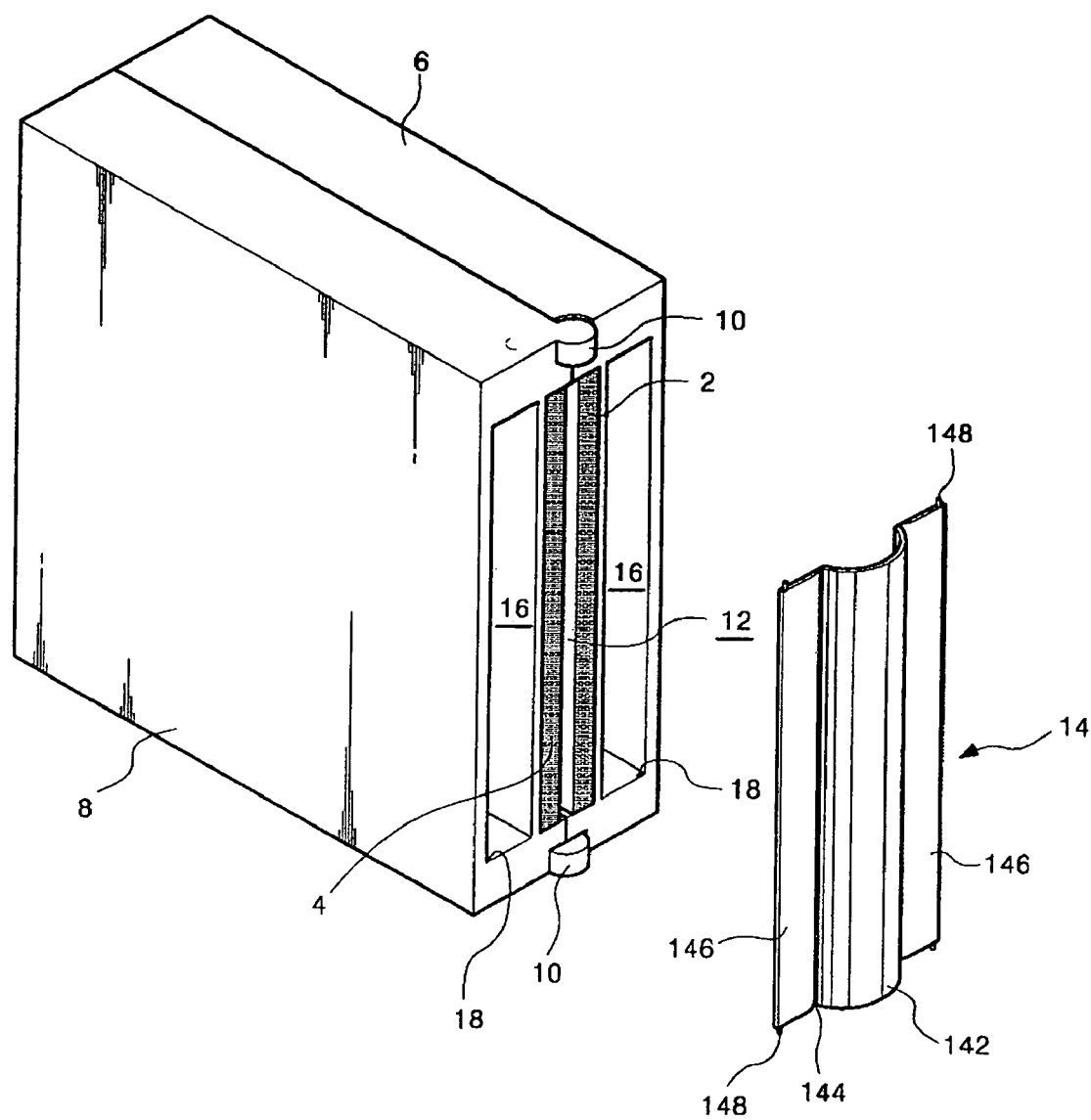

As shown in FIGS. 2 and 3, the foldable case maintains the flat panel display elements 2 and 4 being folded on each other, thereby providing the convenient carrying and reserving. At this point, the cover means 14 covers the opening 12 of the panel housings 6 and 8 and the sidewalls of the flat panel display elements 2 and 4.

When the display device is unfolded as shown in FIGS. 1 and 4, the cover means 14 rotates to be received in the shelter 16 while the panel housings 6 and 8 are unfolded. That is, as the panel housings 6 and 8 are unfolded, the side cover 146 rotates to move into the shelter 16.

Figure 7:
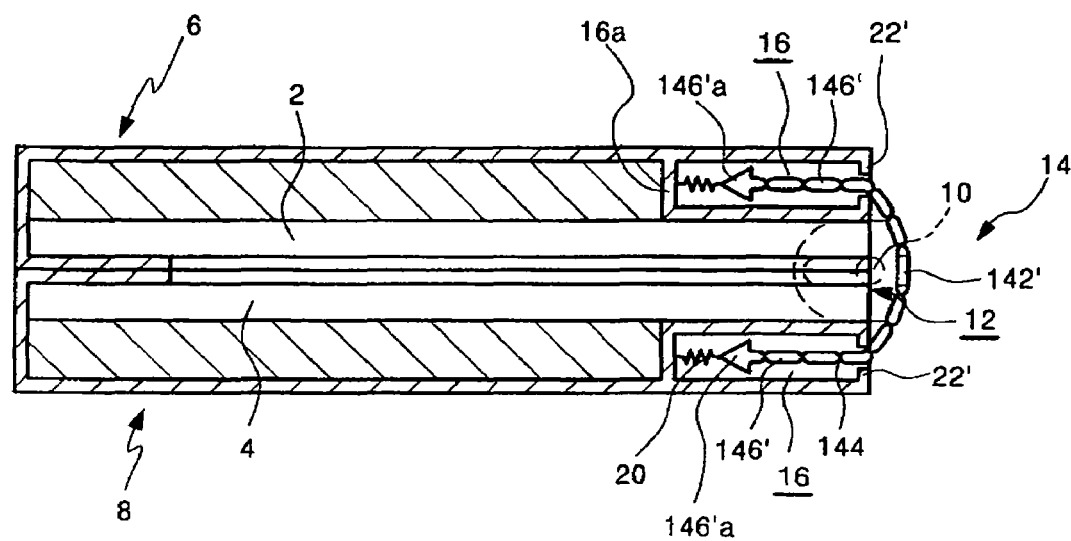
FIGS. 7 and 8 are sectional views illustrating another cover means of the first embodiment.
Figure 8:
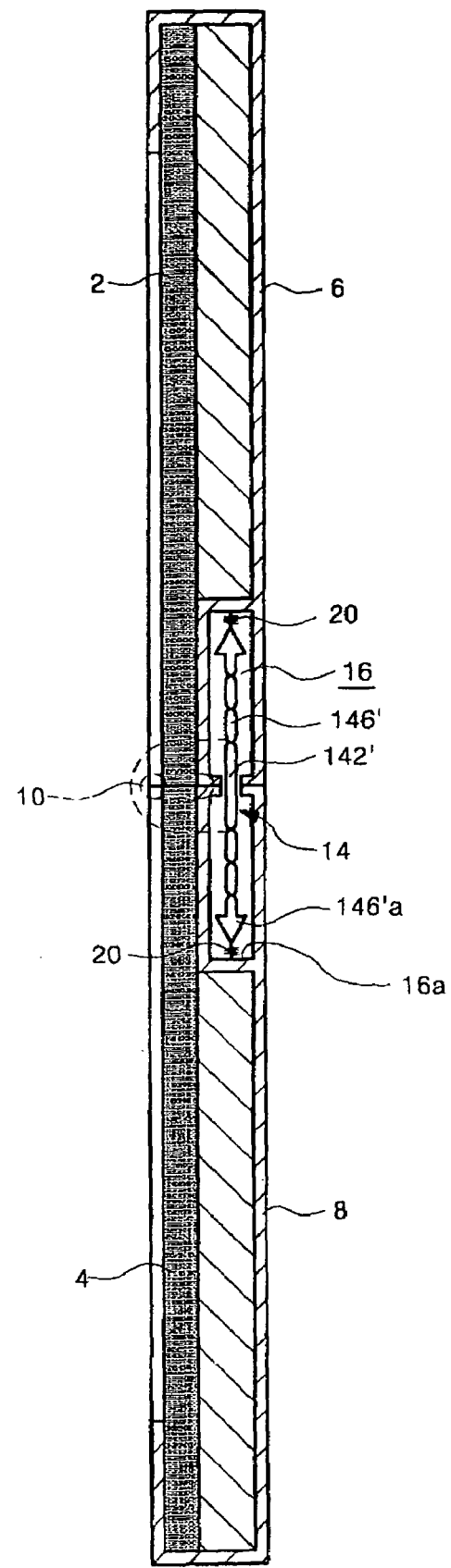

FIGS. 7 and 8 show another embodiment of the case of the portable display device.

In the drawings, cover means 14 covering an opening 12 of panel housings 6 and 8 includes a center cover 142' and side cover 146' formed on both sides of the center cover 142' to be bendable.

The side cover 146' is formed of plural unit covers connected by connecting members 144. The connecting members 144 are formed by making the same to be thin or a hinge.

The side cover 146' is preferable formed of fabric material or resins so that it can be flexibly bent.

The both ends of the side cover 146' is received in a shelter 16. At this point, to prevent the side cover 146' from being moved out of the shelter 16, a hook step 146'a is formed on the both ends of the side cover 146' and a stopper 22' on which the hook step 146'a is hooked is formed on the shelter 16.

An elastic member 20 is disposed between one end of the side cover 146' and the inner wall 16a of the shelter 16. The elastic member 20 functions as the cover-folding means of the above embodiment. That is, the elastic member 20 biases the side cover 146' so that the center cover 142' closely contact the sidewall of the panel housings 6 and 8 when the panel housings 6 and 8 are folded (see FIG. 7), and biases the side cover 146' vertically to that the side cover 146' is received in the shelter 16 when the panel housings 6 and 8 are unfolded (see FIG. 8).

Accordingly, the cover means 14 covers the opening 12 when the panel housings 6 and 8 are folded and is completely received in the shelter 16 when the panel housings 6 and 8 are unfolded.

Figure 9:
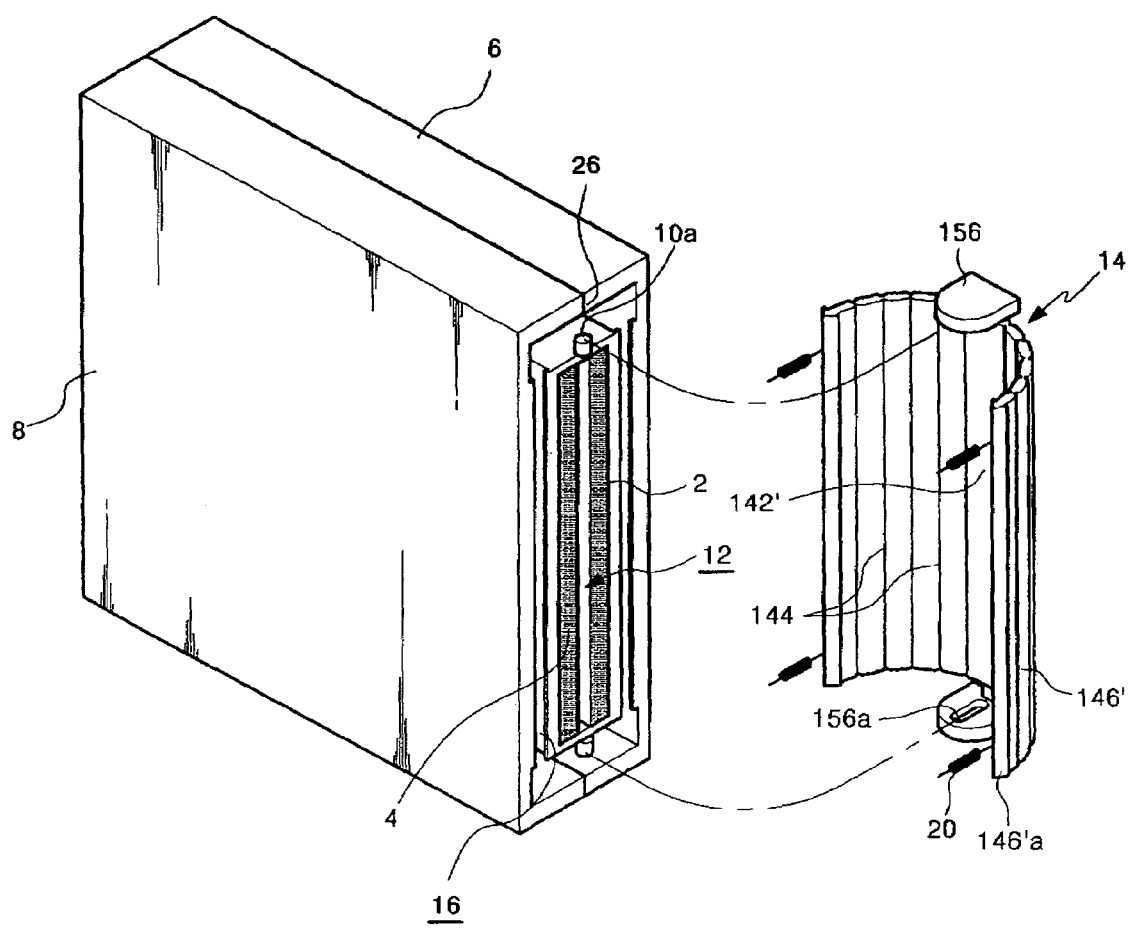
FIG. 9 is a perspective view illustrating another example of the cover means of the first embodiment.

Furthermore, in this embodiment, to prevent the cover means 14 from being inclined, as shown in FIG. 9, a mounting part 156 is formed on upper and lower portions of the center cover 142' in a ⊏-shape. A longitudinal groove 156a is formed on an inner surface of the mounting part 156, and a shaft projection 10a supportably coupled to the longitudinal groove 156a is formed on a folding supporting member 10.

Accordingly, the center cover 142' is centrally disposed by the coupling of the shaft projection 10a and the longitudinal groove 156a. In addition, the center cover 142 is slidable by the longitudinal groove 156a. That is, as shown in FIG. 7, when the panel housings 6 and 8 are folded, the center cover 142' slides to the sidewall of the panel housings 6 and 8 (i.e, to the left hand in the drawing), and as shown in FIG. 8, when the panel housings 6 and 8 are unfolded, the center cover 142' slides to the right hand in the drawing.

In addition, to prevent the mounting part 156 of the center cover 142' from projecting out of the center cover 142', a finalizing part 26 enclosing the mounting part 156 is formed by enlarging the panel housings 6 and 8.

Second Embodiment

Figure 10:
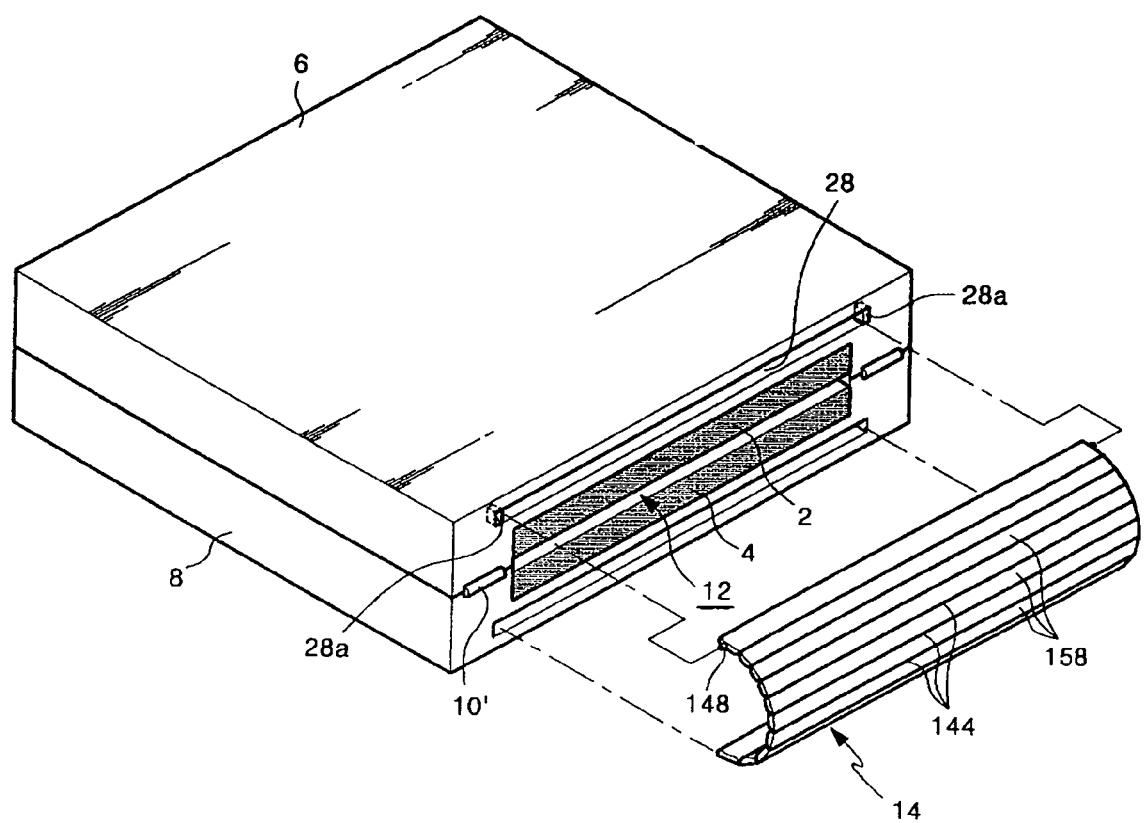
FIGS. 10 to 12 are respectively a perspective view and sectional views illustrating a case for a portable display device according to a second embodiment of the present invention.
Figure 11:
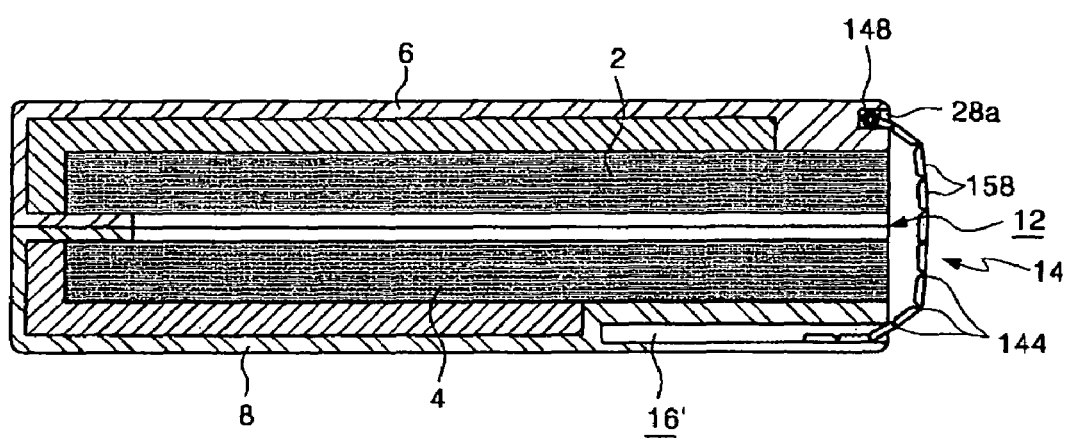
Figure 12:
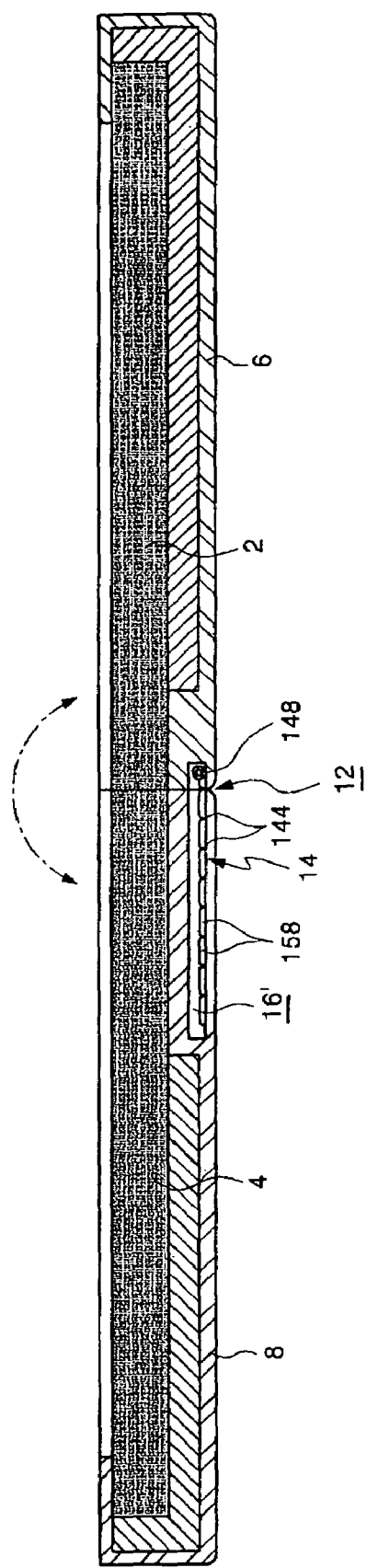

FIGS. 10 to 12 show a case for a portable display device according to a second embodiment of the present invention.

The case includes a pair of panel housings 6 and 8 for respectively receiving a pair flat display elements 2 and 4 and a folding support 10', and cover means 14.

The folding support 10' is preferably formed of a hinge assembly mounted on a border between the panel housings 6 and 8. The folding support 10' should be mounted on a rotational center of the panel housings 6 and 8 so that the adjacent sides of the flat panel elements 2 and 4 can be exactly located on the border between the flat panel elements 2 and 4.

In this embodiment, to cover the flat display elements 2 and 4 exposed through the opening 12, cover means is provided.

The cover means 14 preferably includes plural unit covers 158 connected to each other by a connecting portion 144. The connecting member 144 is defined by a thin part of the cover means 14 so that it can be flexibly folded. A hinge shaft 148 is mounted on the outermost unit cover 158.

Fixing means on which the hinge shaft 148 is fixed is formed on the panel housing 6. The fixing means includes a groove 28, in which the hinge shaft 148 is inserted, formed on the panel housing 6 and a hook portion 28a for preventing the hinge shaft 148 from moving away.

Accordingly, one end of the cover means 14 is fixed on the panel housing 6 while the other end is free, which is received in the shelter 16'.

Therefore, when the panel housings 6 and 8 are folded as shown in FIG. 11, the cover means 14 covers the opening 12 and the one sidewall of the flat panel display elements 2 and 4. When the panel housings 6 and 8 are unfolded as shown in FIG. 12, the hinge shaft 148 is fixed and the free end is moved into the shelter 16'.

Figure 13:
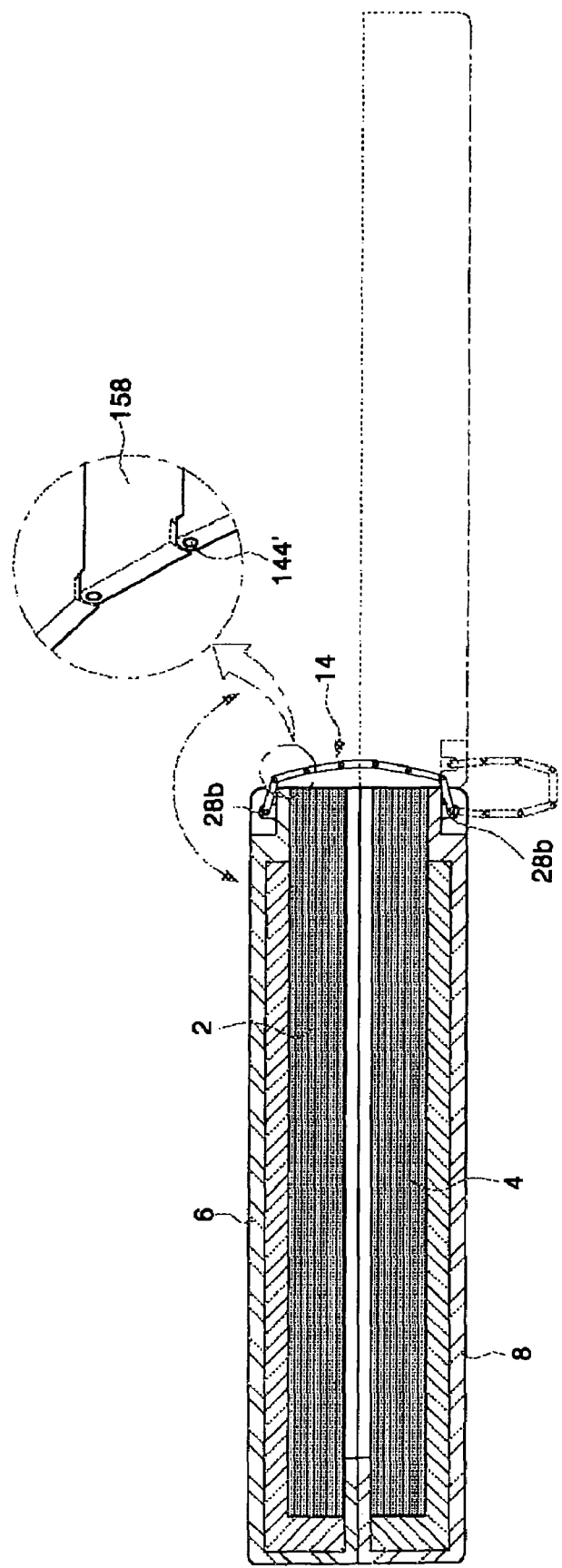
FIG. 13 is a sectional view illustrating another example of cover means of the second embodiment.

FIG. 13 shows the cover means 14 both ends of which are fixed. As shown in the drawing, the cover means 14 includes hinge shafts 148 respectively provided on both outermost unit covers 158. The hinge shafts 148 are supportably fixed by fixing means.

The fixing means is mounted on the panel housings 6 and 8 and formed of hinge fixing member 28b on which the hinge shafts 148 are rotatably coupled.

When the panel housings 6 and 8 are folded (see a solid line in the drawing), the cover means 14 covers the sidewalls of the flat panel display elements 2 and 4, and when unfolded (see a broken line in the drawing), extended outside.

The unit covers 158 may be connected to each other by a connecting part 144 formed of hinges.

Third Embodiment

Figure 14:
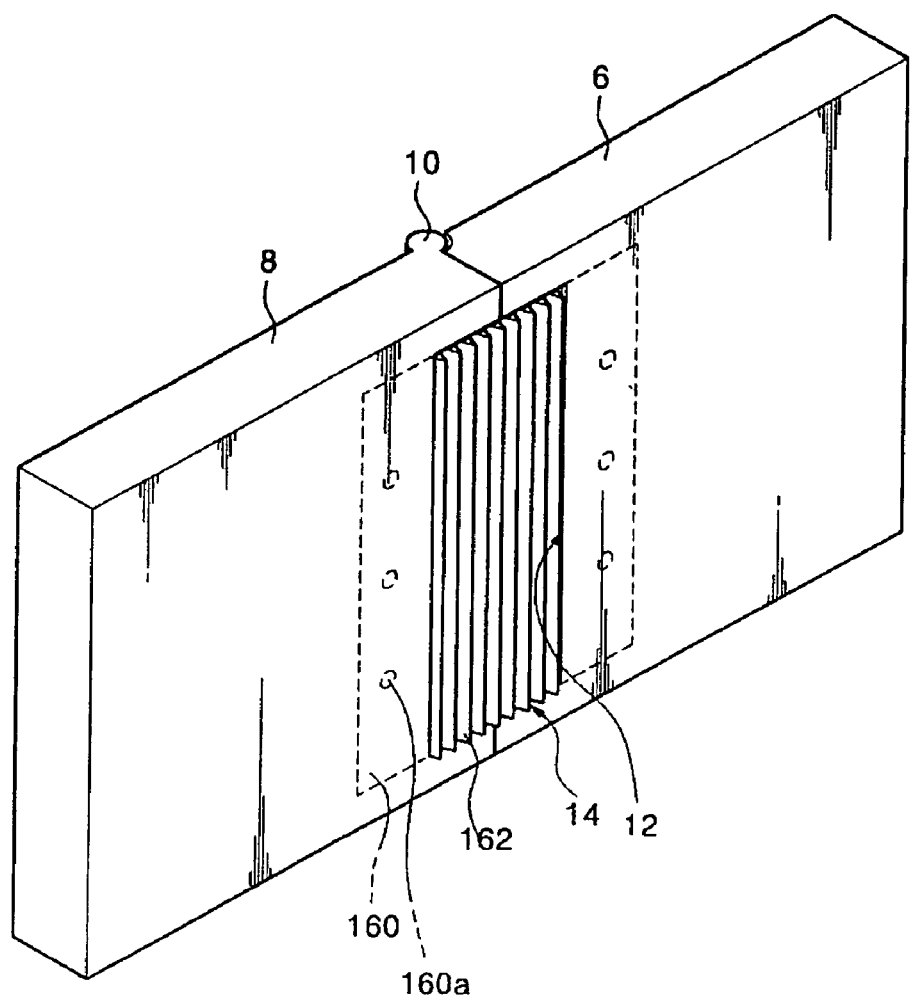
FIGS. 14 and 15 are perspective views illustrating a case for a portable display device according to a third embodiment of the present invention.
Figure 15:
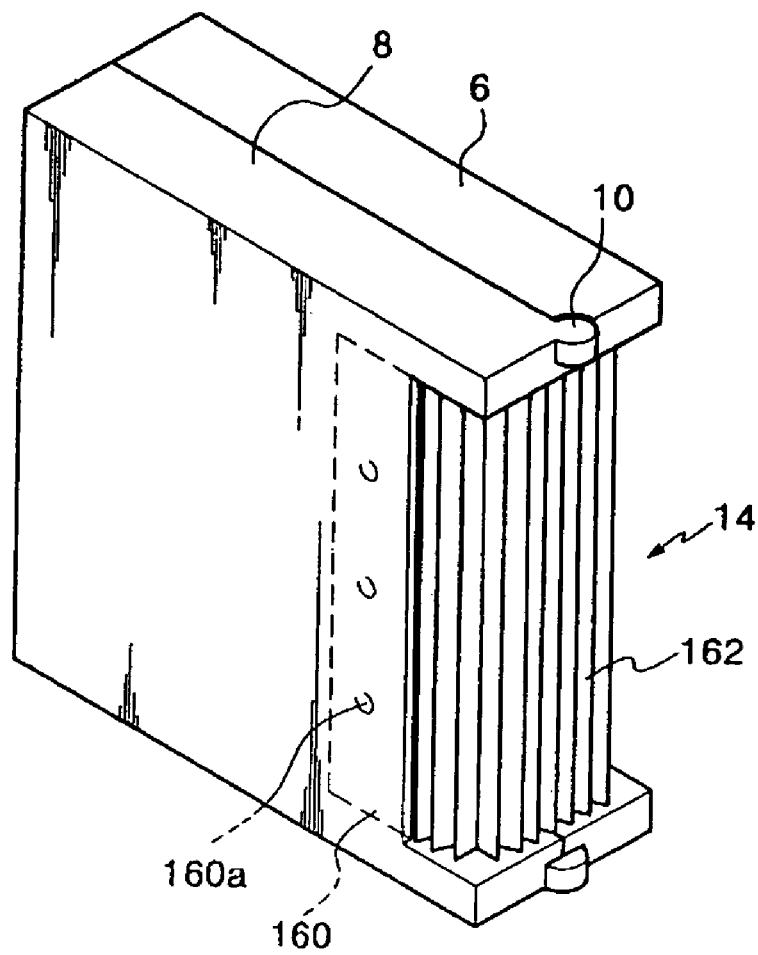

FIGS. 14 to 15 show a case for a portable display device according to a third embodiment of the present invention.

The case includes a pair of panel housings 6 and 8 for respectively receiving a pair flat display elements 2 and 4 and a folding support 10, and cover means 14.

In this embodiment, the cover means 14 for covering an opening 12 of the panel housings 6 and 8 is designed to be extended when the panel housings 6 and 8 are folded and to be contracted when unfolded.

That is, the cover means 14 is formed in a bellows-shape. Describing more in detail, the cover means 14 comprises a coupling part 160 having coupling means fixed on an inner surface of the sidewall of the panel housings 6 and 8 and a bellows part 162.

The coupling part 160 includes a hole 160a and a screw (not shown) coupled in the hole 160a so as to be fixed on the inner surface of the panel housings 6 and 8.

The bellows part 162 is formed of fabric, plastic or synthetic resins. The coupling part 160 may be formed of material identical to that of the bellows part 162 or a metal.

Accordingly, when the panel housings 6 and 8 are unfolded as shown in FIG. 14, the cover means 14 is shrunken to cover the opening 12, and when folded as shown in FIG. 15, the cover means 14 is stretched in a state where the opening 12 is covered.

Figure 16:
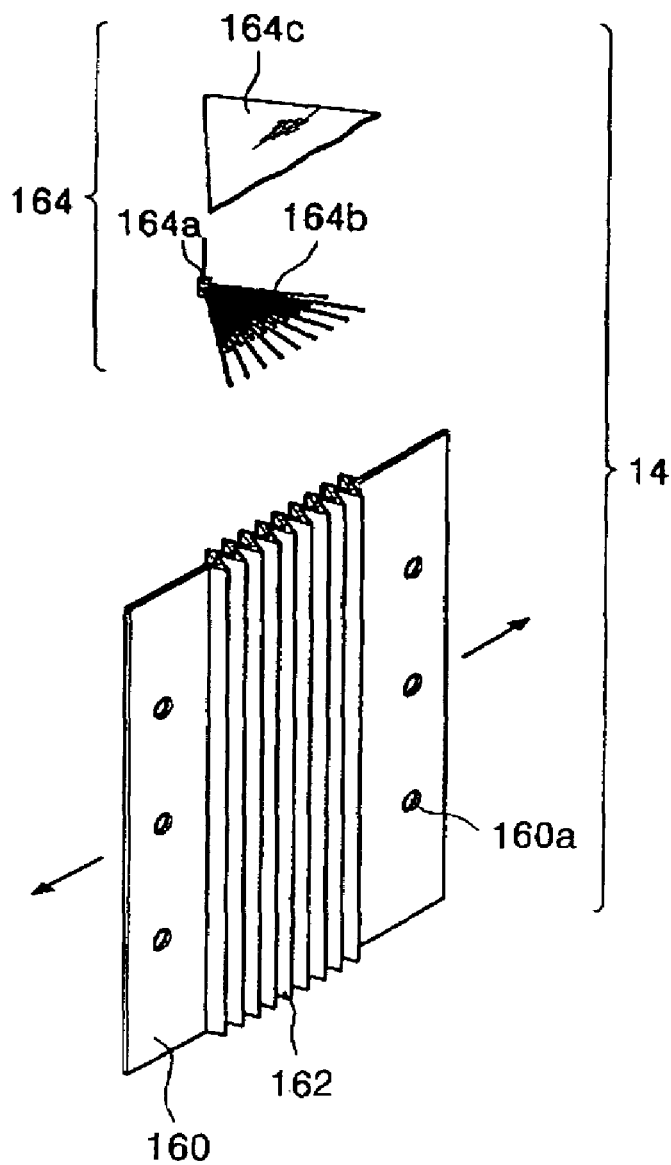
FIGS. 16 and 17 are perspective views illustrating another example of cover means of the third embodiment.
Figure 17:
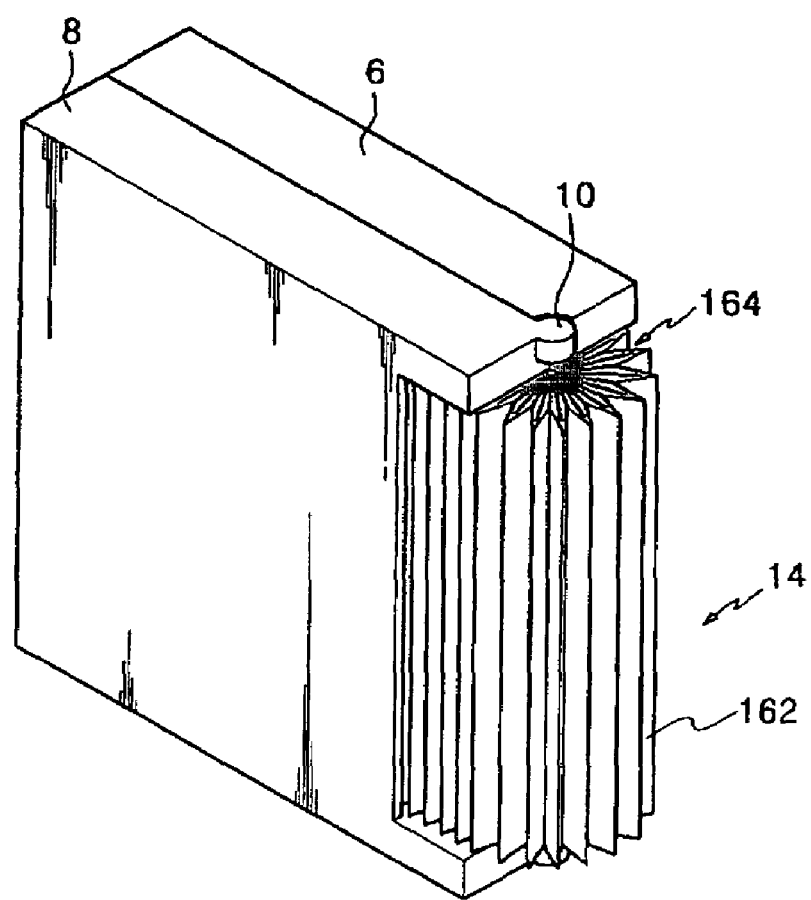

FIGS. 16 and 17 show another example of the cover means 14.

As shown in the drawings, the cover means 14 includes a coupling part 160, a bellows part 162, and a protecting cover 164 connected to the folding support member 10 while covering the upper and lower sides of the bellows part 162.

The protecting cover 164 prevents the upper and lower sides of the bellows part 162 from being exposed when the panel housings 6 and 8 are folded, while enhancing the stretch or shrink operation of the bellows part 162. That is, the protecting cover 164 includes a coupling member 164a coupled to the folding support member 10 mounted on a rotational center of the panel housings 6 and 8, a holder 164b coupled to the coupling member 164a and connected to the bellows part 162, and a cover 164c covered by the holder 164b. The coupling member 164a is fitted in the holder 164b. Preferably, the cover 164c is formed of material identical to that of the bellows part 162.

Fourth Embodiment

Figure 18:
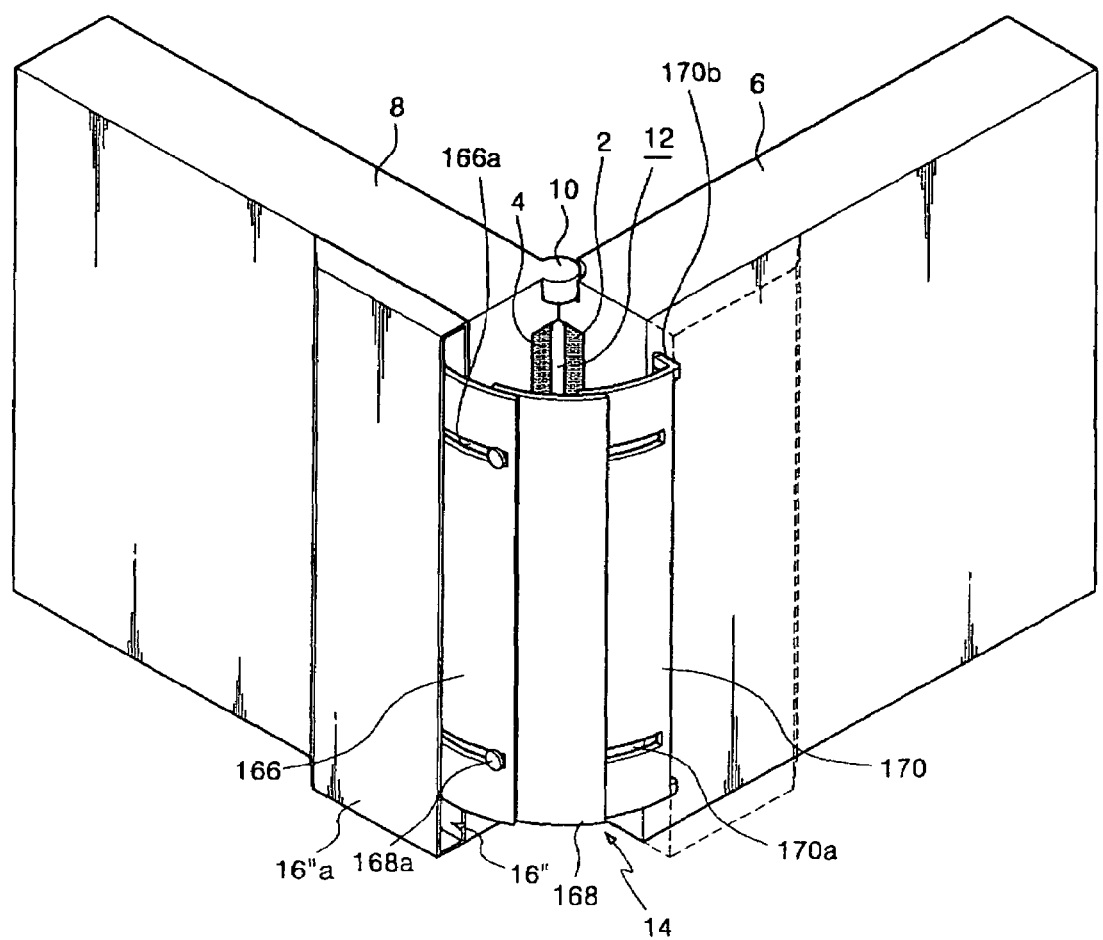
FIGS. 18 and 19 are perspective views illustrating a case for a portable display device according to a fourth embodiment of the present invention.
Figure 19:
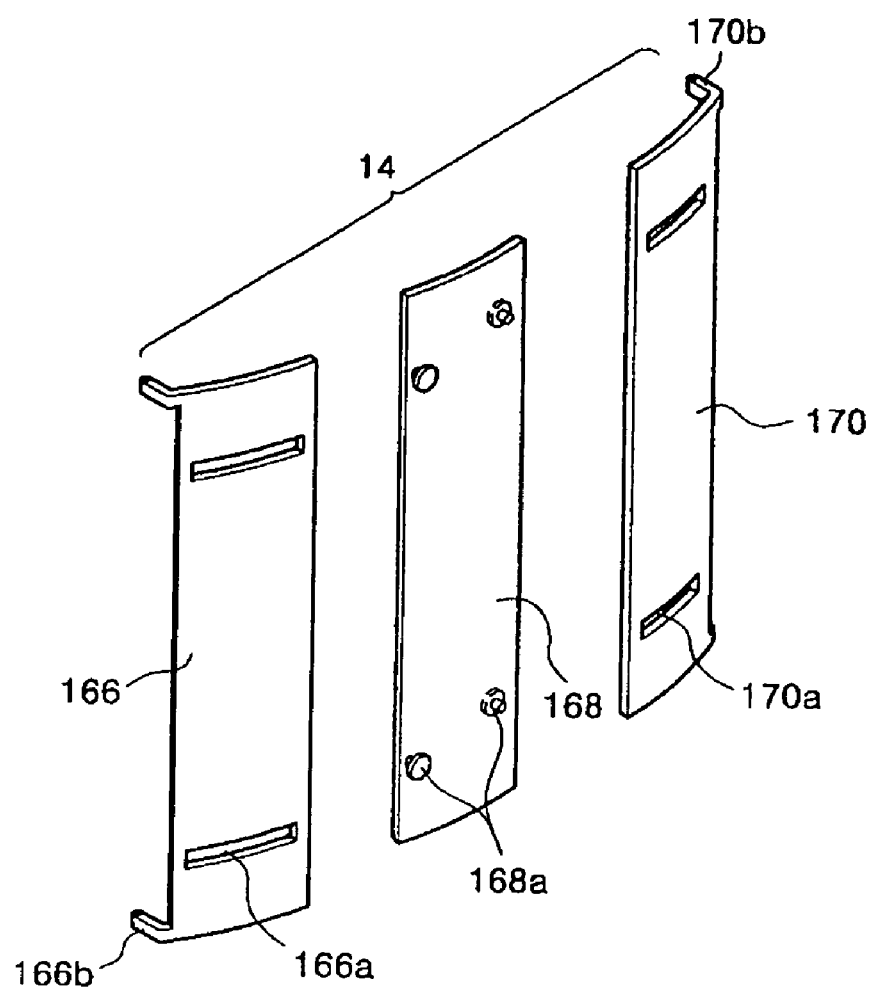

FIGS. 18 to 19 show a foldable case for a portable display device according to a fourth embodiment of the present invention.

The foldable case includes a pair of panel housings 6 and 8 for respectively receiving a pair flat display elements 2 and 4 and a folding support 10, and cover means 14.

In this embodiment, the cover means 14 for covering an opening 12 of the panel housings 6 and 8 is designed to be slid in more than two steps. That is, the cover means 14 is formed in a sliding protecting member for covering the opening 12 when the panel housings are folded and received in the panel housings when the panel housings are unfolded.

In addition, plural unit covers may be slidably connected so that the cover means 14 can be folded in more than three steps.

Describing more in detail, the cover means 14 includes first, second and third covers 166, 168 and 170. For the sliding engagement, sliding grooves 166a and 170a are respectively provided on the first and third covers 166 and 170, and a sliding projection 168a engaged with the sliding grooves 166a and 170a is formed on the second cover 168.

The sliding projection 168a is formed on inner and outer surfaces of the second cover 168 in an opposite direction so that the first and third covers 166 and 170 performs the folding operation in the three steps.

The cover means 14 is fixed on an outer surface of the sidewalls of the panel housings 6 and 8 by coupling means. In this embodiment, the coupling means includes bendable connecting parts 166b and 170b extending outside the first and third covers 166 and 170. The bendable connecting parts 166b and 170b are pivotally fixed on the panel housings 6 and 8.

To receive the cover means 14, a shelter 16" is formed in the panel housing 8. The shelter 16" is formed of an additional panel 16"a attached on a surface of the panel housing 8. As shown in a broken line of FIG. 18, the panel 16"a may be formed on the both panel housings 6 and 8.

Accordingly, when the panel housings 6 and 8 are folded, the cover means 14 is stretched as shown in FIG. 18 to cover the opening 12 and the sidewalls of the flat panel display elements 2 and 4. When the panel housings 6 and 8 are unfolded, the cover means 14 is received in the shelter 16".

Figure 20:
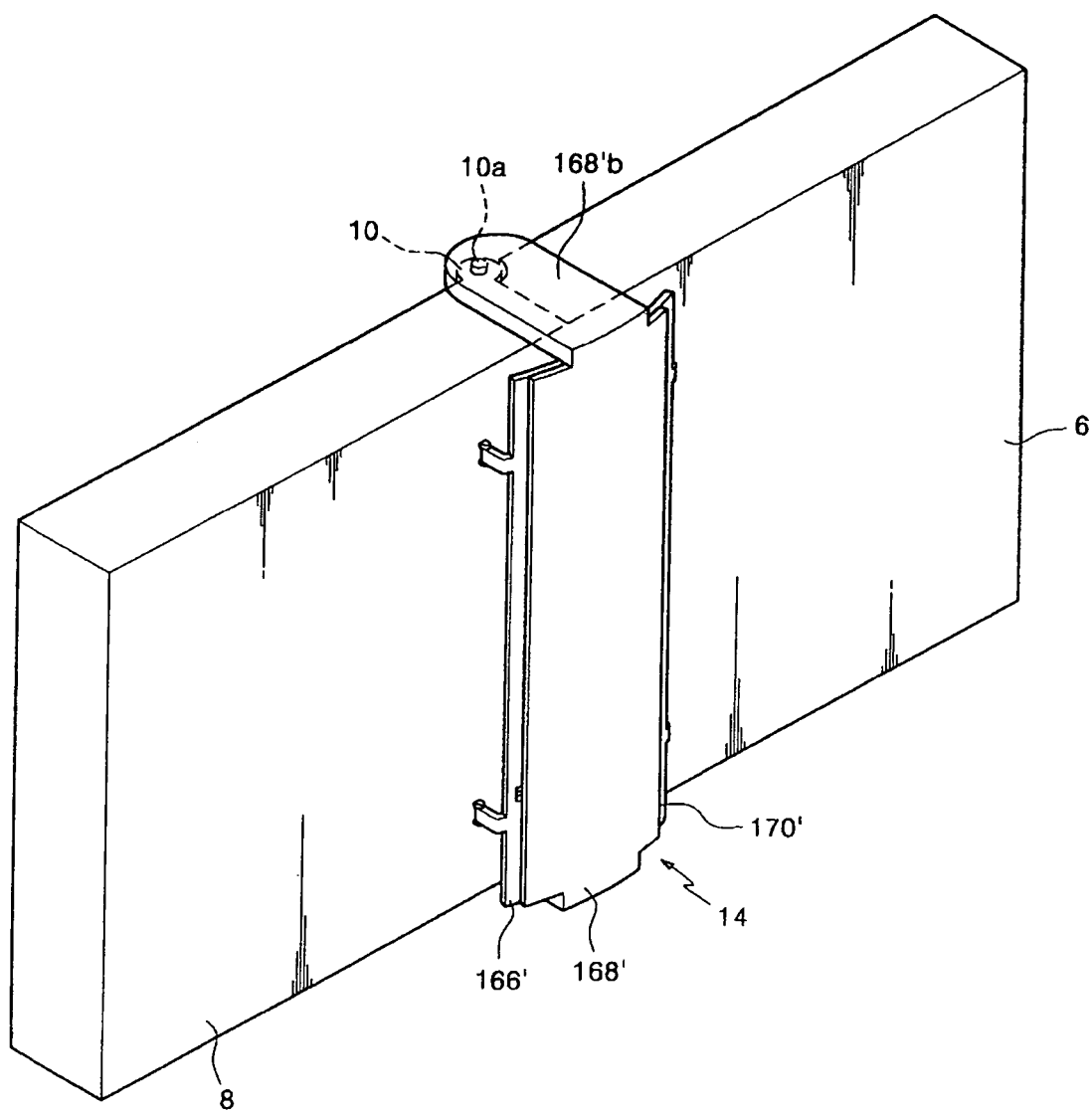
FIGS. 20 and 21 are perspective views illustrating another example of cover means of the fourth embodiment.
Figure 21:
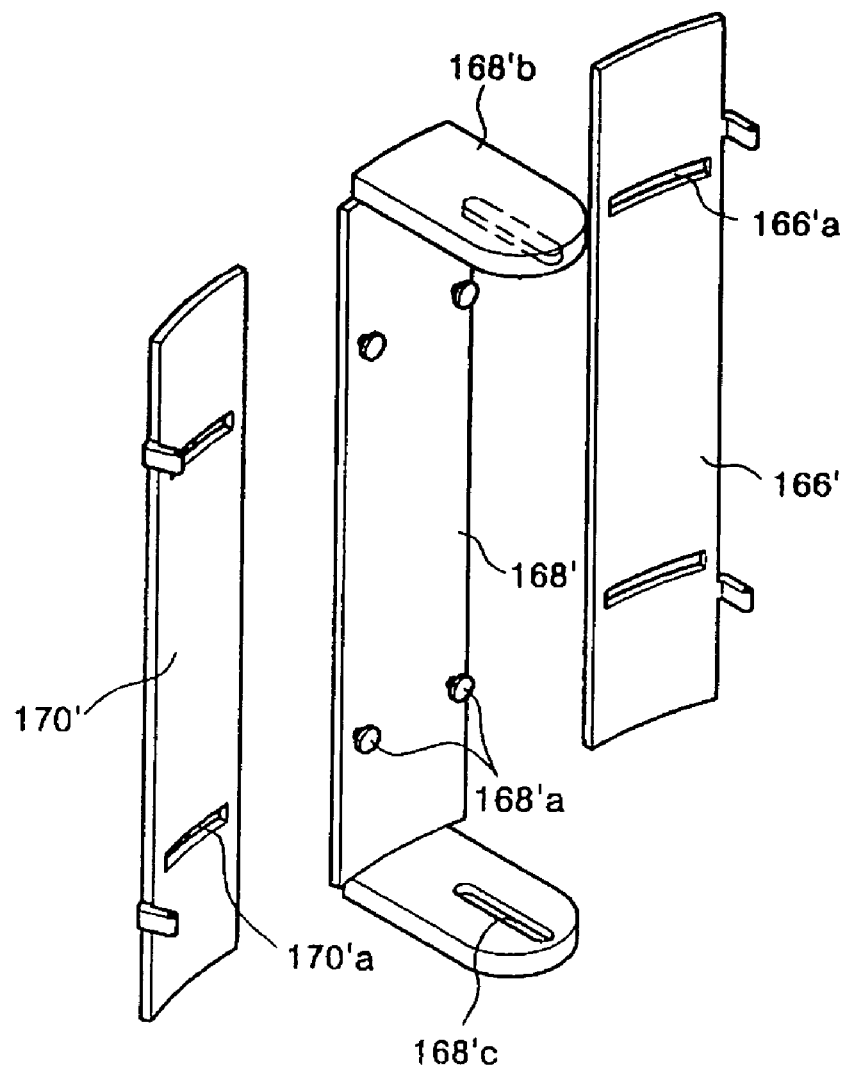

FIGS. 20 and 21 shows another example of the cover means 14.

In this example, the cover means 14 includes first, second and third covers 166', 168' and 170'. A sliding projection 168'a of the second cover 168' is coupled to sliding grooves 166'a and 170'a of the first and third covers 166' and 170'. The sliding projection 168'a is formed in the inner surface of the second cover 168' so that the first and third covers 166' and 170' can be received in the second cover 168' when the panel housings 6 and 8 are unfolded.

To prevent the cover means 14 from directing in only one direction during the folding and unfolding operation, a ⊏-shaped mount part 168'b is mounted on the upper and lower portions of the second cover 168', and a longitudinal groove 168'c is formed on an inner surface of the mount part 168'b. A shaft projection 10a engaged with the longitudinal groove 168'c is formed on the folding support member 10.

Accordingly, by the engagement of the shaft projection 10a and the longitudinal groove 168'c, the second cover 168' can be located on the center. As the second cover 168' is designed to slide by the longitudinal groove 168'c, the second cover 168' can smoothly moves to or from the sidewalls of the panel housings 6 and 8 during the folding and unfolding operation of the panel housings 6 and 8.

In this embodiment, the cover means 14 is formed of three unit covers. However, the present invention is not limited to this embodiment. That is, when the unit cover is flexibly formed, the number of unit covers can be limited to two.

Fifth Embodiment

Figure 22:
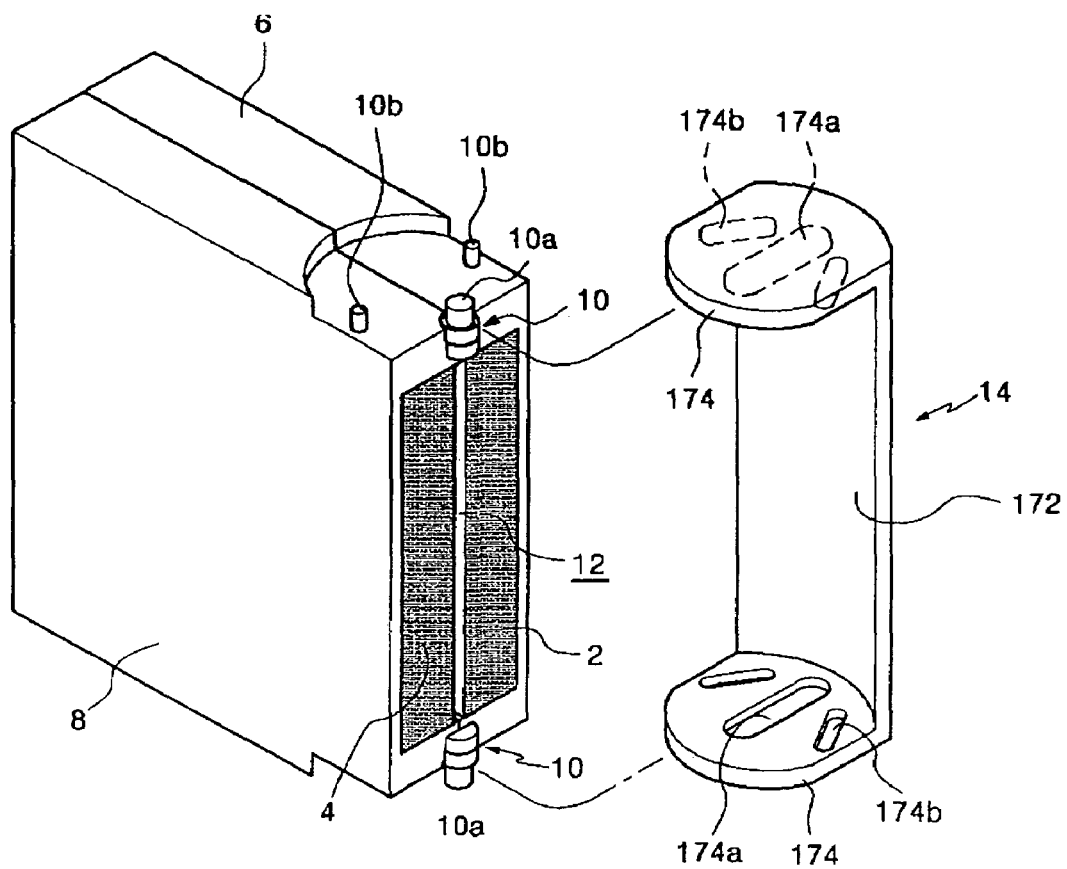
FIGS. 22 to 24 are views illustrating a case for a portable display device according to a fifth embodiment of the present invention.
Figure 23:
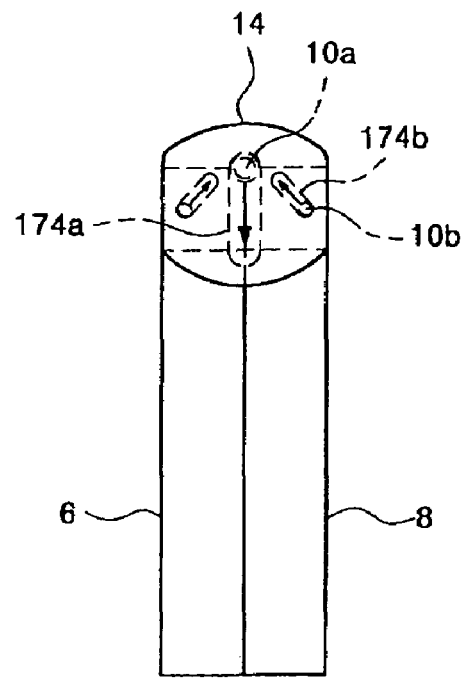
Figure 24:
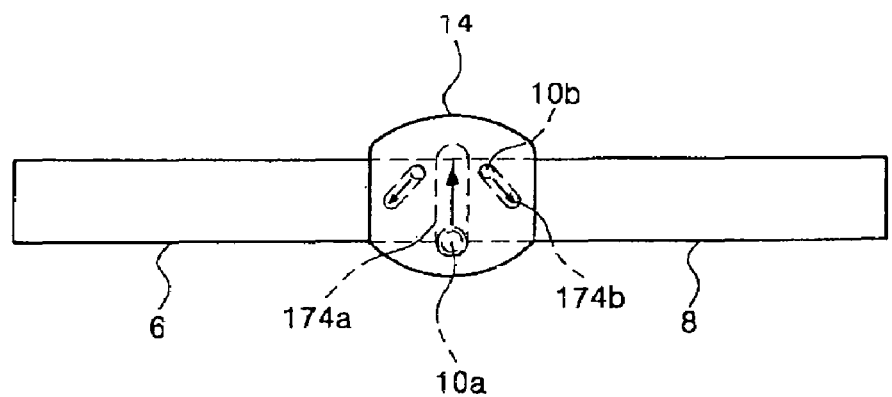

FIGS. 22 to 24 show a case for a portable display device according to a fifth embodiment of the present invention.

The case includes a pair of panel housings 6 and 8 for respectively receiving a pair flat display elements 2 and 4 and a folding support 10, and cover means 14.

In this embodiment, the cover means 14 for covering an opening 12 of the panel housings 6 and 8 is designed to enhance the unfolding operation of the panel housings.

The cover means 14 is located behind the border of the panel housings. And the cover means is formed in a ⊏-shape.

Describing more in detail, the cover means 14 includes a cover body 172 and a mount part 174 formed on upper and lower portions of the cover body 172, thereby defining the ⊏-shape. A longitudinal groove 174a is formed on the mount part 174. A shaft projection 10a is slidably coupled to the longitudinal groove 174a.

Accordingly, when the panel housings 6 and 8 are unfolded (see upper sides of FIG. 24), the cover means 14 is pushed rearward, and when folded (see lower sides of FIG. 23), is moved forward.

To realize the sliding operation in only one direction, an inclined groove 174b is formed on the both sides of the longitudinal groove 174a. A projection 10b engaged with the inclined groove 174b is formed on the panel housings 6 and 8. The inclined groove 174b and the projection 10b allows the sidewalls of the cover means 14 to closely contact the panel housings 6 and 8.

To enhance the close contact of the panel housings to the sidewalls of the cover means 14, the inclined groove 174b may be formed in an arc-shape.

When the panel housings 6 and 8 are folded, the cover means 14 covers the opening 12 and the sidewalls of the flat panel display elements 2 and 4 as shown in FIGS. 22 and 23. At this point, the projection 10b of the panel housings 6 and 8 is caught by a front end of the inclined groove 174b, and the shaft projection 10a is caught by the rear end of the longitudinal groove 174a.

When the panel housings 6 and 8 are unfolded to use the display device as shown in FIG. 24, the projection 10b is moved to the rear side of the inclined groove 174b and the shaft projection 10a is moved to the front side of the longitudinal groove 174a. However, the location of the cover means 14 is not varied. That is, only the projection 10b and the shaft projection 10a slides along the grooves 174b and 174a.

Figure 25:
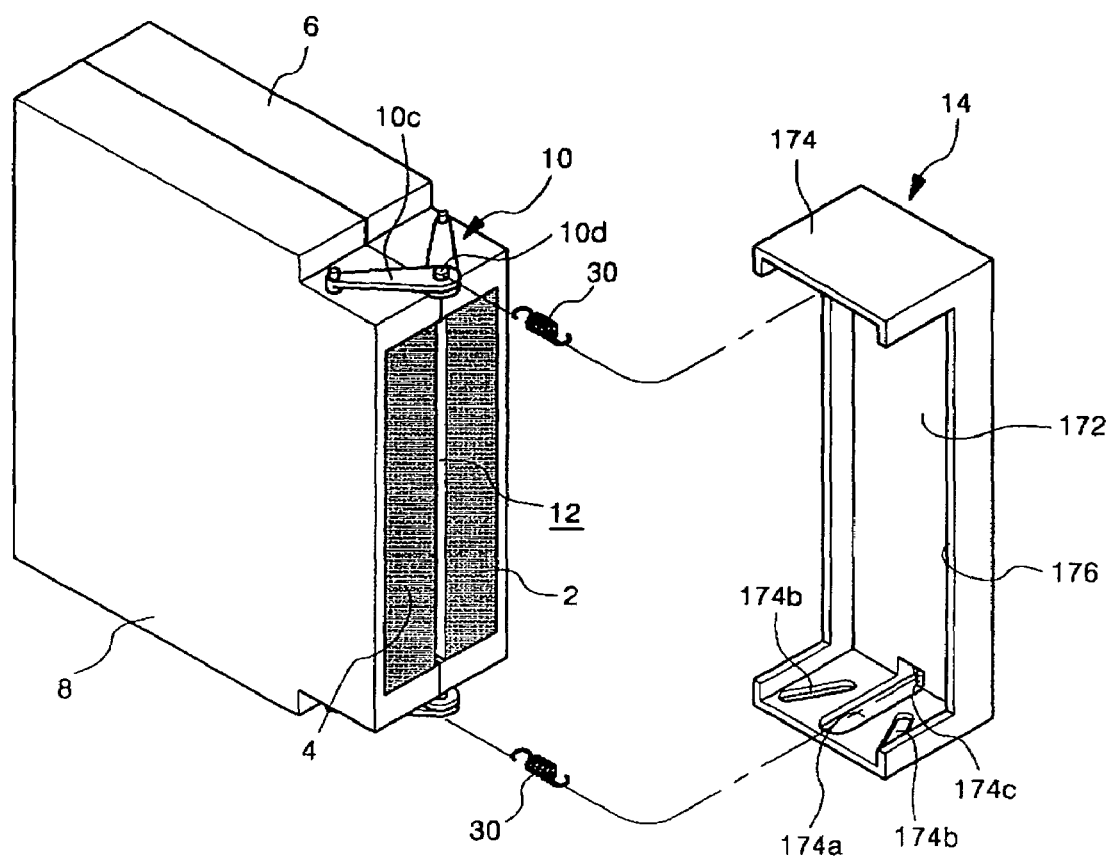
FIG. 25 is a perspective view illustrating another example of cover means of the fifth embodiment.
Figure 26:
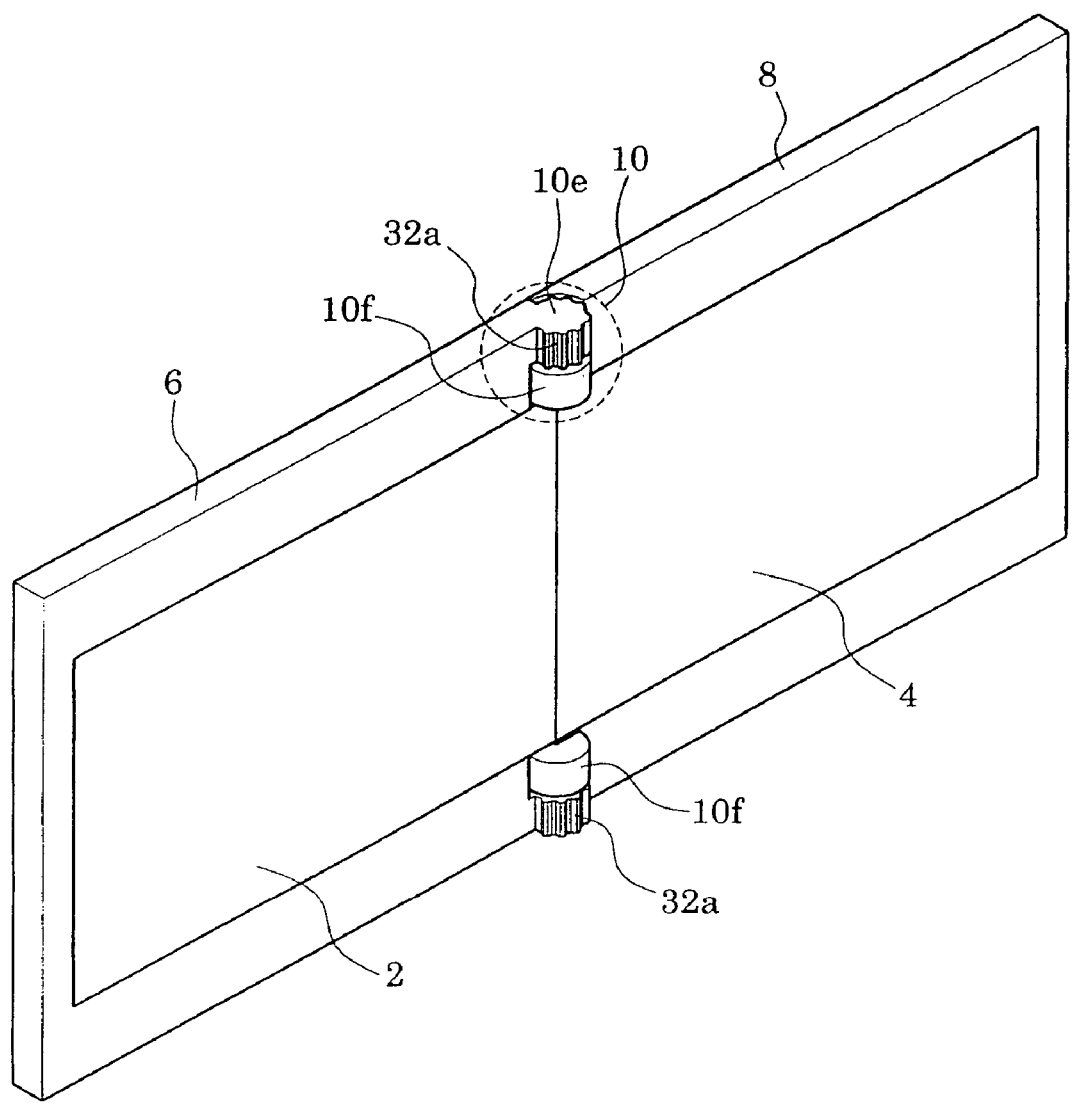
FIGS. 26 to 29 are views illustrating a case for a portable display device according to a sixth embodiment of the present invention.

FIG. 25 shows another example of the cover means.

To prevent the panel housings 6 and 8 from being inadvertently unfolded, the cover means 14 includes a guide wall 176 enclosing the sidewalls of the panel housings 6 and 8 when they are folded.

In this embodiment, two rotational bars 10c, each one end of which coupled on the panel housings 6 and 8 and each the other end of which is coupled to a rotational shaft 10d are mounted on the folding support member 10. The rotational shaft 10d is located on a rotational center of the panel housings 6 and 8.

In addition, to enhance the unfolding operation of the panel housings 6 and 8, a second projection 174c is formed inside the longitudinal groove 174a of the cover means 14, and an elastic member 30 is mounted between the second projection 174c and the rotational shaft 10d of the panel housings 6 and 8. The elastic member 30 biases the cover means 14 to the panel housings 6 and 8 when the case is folded or unfolded, thereby completely covers the opening 12 and the flat panel display elements 2 and 4.

Sixth Embodiment

FIGS. 26 to 29 show a case for a portable display device according to a sixth embodiment of the present invention.

The case includes a pair of panel housings 6 and 8 for respectively receiving a pair flat display elements 2 and 4 and a folding support 10, and cover means 14.

In this embodiment, the cover means 14 for supporting the flat panel display elements 2 and 4 to contact each other when the panel housings 6 and 8 are unfolded and for covering an opening 12 of the panel housings 6 and 8 when the panel housings 6 and 8 are folded is provided. In addition, cover driving means for opening and closing the cover means 14 together with the folding and unfolding operation of the panel housings 6 and 8 is further provided.

The cover means 14 is designed not to interfere the close contact of the flat panel display elements of the panel housings 6 and 8.

The cover driving means is formed of an elastic member or a gear.

The cover means 14 of this embodiment is formed in a sheet-shape body so that it can be flexibly bent to cover the sidewalls of the flat panel display elements 2 and 4.

The cover means 14 is provided at its inner surface with concave portion 178a and convex portion 178b. The convex portion 178b is formed in a rectangular panel, and the concave portion 178a is formed in flexible connector. The cover means 14 may be formed in a bellows-shape to provide the concave and convex portions 178a and 178b.

The cover driving means of this embodiment includes a gear part 32a formed on an outer circumference of a first cylinder 10e of the folding support member 10, an idle gear 32b engaged with the gear part 32a, and a driving gear 32c engaged with the concave and convex portions 178a and 178b of the cover means 14. The idle gear 32b and the driving gear 32c are mounted inside the panel housing 8.

Accordingly, the rotation motion of the panel housing 6 and the folding support member 10 linearly moves the cover means 14. The reference numeral 10f indicates a second cylinder of the folding support member 10.

Figure 27:
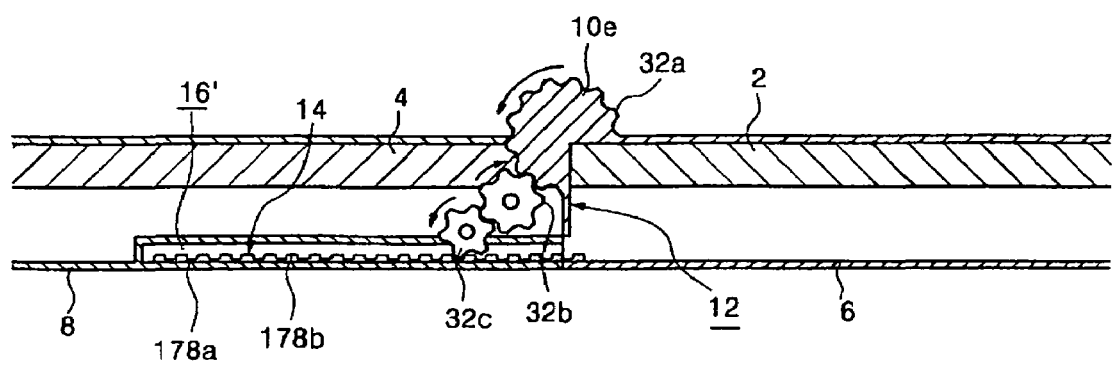

In this embodiment, when the panel housings 6 and 8 are folded from the unfolded state (see FIGS. 26 and 27), the first cylinder 10e rotates counterclockwise in the drawings while rotating the idle gear 32b and the driving gear 32c, thereby spreading the cover means 14 in the rightward direction in FIG. 27.

Figure 28:
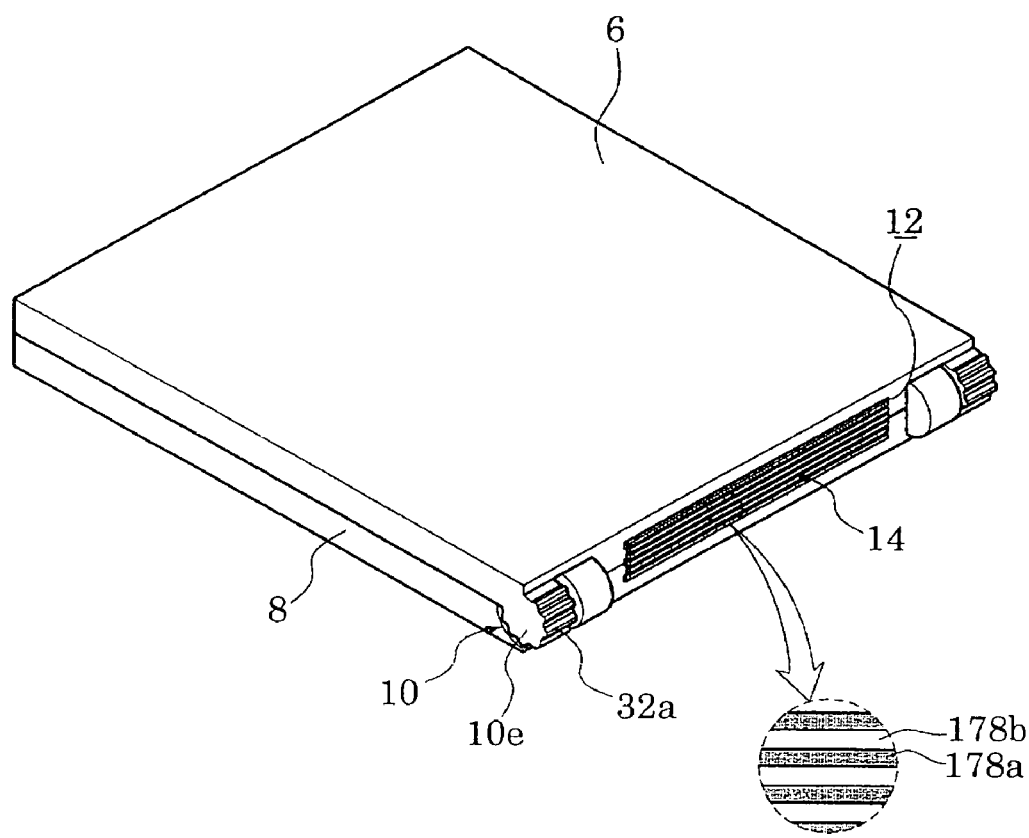
Figure 29:
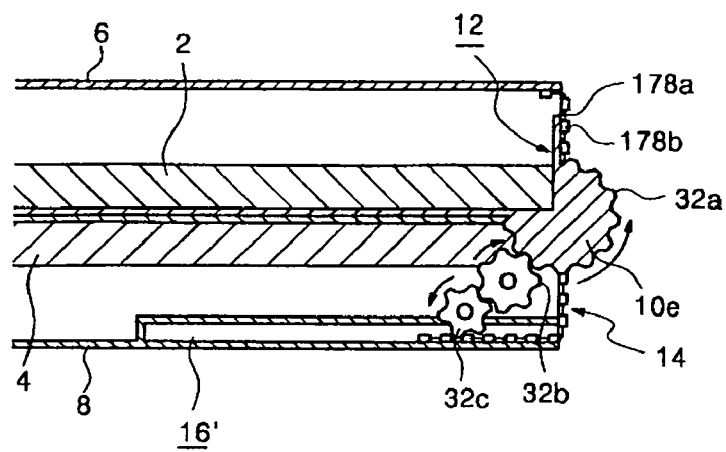

As shown in FIGS. 28 and 29, when the panel housings 6 and 8 are completely folded, the cover means 14 covers the opening 12 and the sidewalls of the flat panel display elements 2 and 4.

One end of the cover means 14 is fixed on the panel housing 6, and the other end of the cover means 14 is freely received in the panel housing 8 while being guided by a shelter 16".

Figure 30:
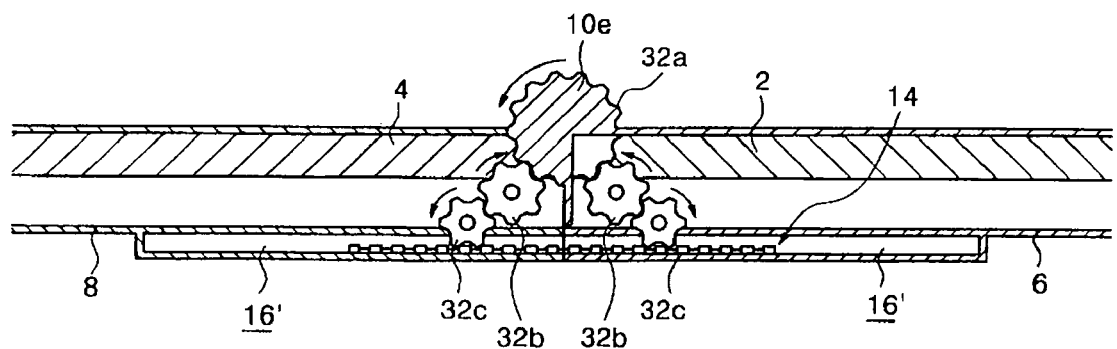
FIG. 30 is a perspective view illustrating another example of cover driving means of the sixth embodiment.

FIG. 30 shows another example of the cover driving means.

The cover driving means includes a gear part 32a formed on the outer circumference of the first cylinder 10e of the folding support member 10 and idle gear 32b and driving gear 32c engaged with the gear part 32a. The shelter 16' is formed in both of the panel housings 6 and 8.

Figure 31:
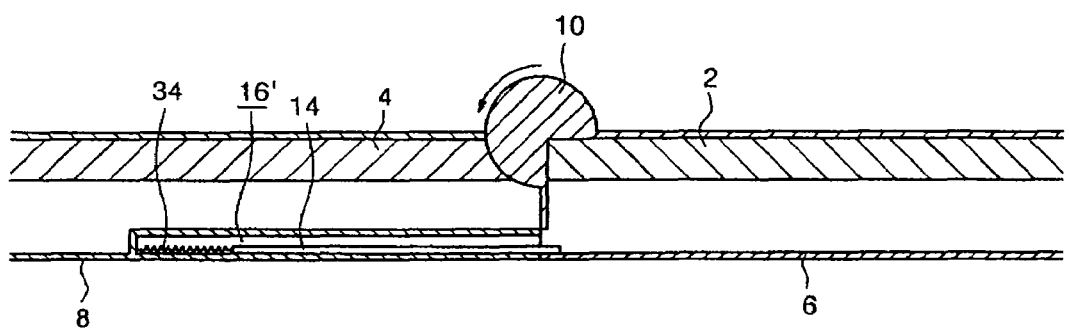
FIGS. 31 and 32 are sectional views illustrating another example of cover driving means of the sixth embodiment.
Figure 32:
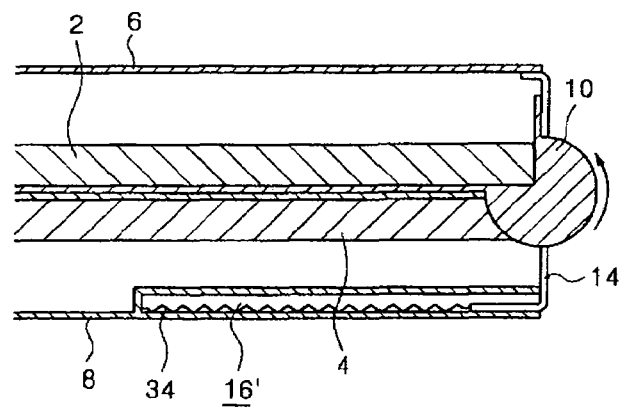

FIGS. 31 and 32 show another example of the cover driving means.

The cover driving means does not employ the gear but uses an elastic member 34.

Describing more in detail, the cover driving means includes the elastic member 34 connected between one end of the cover means 14 and the panel housing 8 in a state where the other end of the cover means 14 is fixed on the panel housing 6. The cover means 14 is formed of a sheet attachable using an adhesive.

When a shelter 16' is formed, the elastic member 34 is connected between the inner wall of the shelter 16' and the cover means 14.

Accordingly, when the panel housings 6 and 8 are unfolded, as shown in FIG. 31, the cover means 14 is received in the shelter 16' by the elastic member 34, and when folded, is expanded to cover the opening 12 and the sidewalls of the flat panel display elements 2 and 4 while overcoming the elastic force of the elastic member 34 as shown in FIG. 32.

INDUSTRIAL APPLICABILITY

As described above, since the foldable case is designed to connect the plural display elements each other, a multi information display device having one enlarged screen can be realized.

Particularly, when the portable display device is unfolded, since the adjacent display elements are exactly coincided, the non-display area is minimized, thereby enhancing the display quality.

In addition, since the exposed parts of the display elements can be covered by the cover means, it can be prevented that the device is damaged by outer shock.

The invention claimed is:

1. A case for a portable display device, comprising:
a foldable panel housing receiving at least two flat panel display elements, the flat panel display elements fanning a co-planar, essentially continuous display, when the panel housing is unfolded;
a folding support member for supporting a folding operation of the panel housing;
a cover means for covering adjacent sidewalls of the flat panel display elements when the panel housing is folded, wherein the cover means is formed of a cover sheet so that it can be bended or unbended by a cover driving means when the panel housing is folded or unfolded; and
the cover means is operated to a location where the cover means does not cover the adjacent sidewalls of the flat panel display elements when the panel housing is unfolded.

2. A case of claim 1 wherein the panel housing includes an opening defined by cutting the sidewalls, the opening being designed such that the adjacent sidewalls of the flat panel display elements contact each other when the panel housing is unfolded.

3. A case of claim 1 wherein the cover means is mounted on a folding part of the panel housing.

4. A case of claim 1 further comprising fixing means for fixing the cover means, the fixing means being an elastic member.

5. A case of claim 1 wherein the folding support member includes a hinge mounted on a rotational center of the panel housing.

6. A case of claim 1 wherein the cover means is designed to be received in a shelter of the panel housing, the shelter receiving the cover means when the panel housing is unfolded.

7. A case of claim 1 further comprising a shelter for receiving the cover means when the panel housing is unfolded.

8. A case of claim 7 further comprising an elastic member disposed between one end portion of the cover means and an inner wall of the shelter.

9. A case of claim 1 wherein the cover driving means comprises an elastic member connected to the other end portion of the cover means and the panel housing.

10. A case of claim 1 wherein the panel housing is provided with a space in which the cover means is received when the panel housing is unfolded, the space being located on an inner or outer side of the panel housing.

11. A case of for a portable display device, comprising:
a foldable panel housing receiving at least two flat panel display elements, the flat panel display elements forming a co-planar, essentially continuous display, when the panel housing is unfolded;
a folding support member for supporting a folding operation of the panel housing;
a cover means for covering adjacent sidewalls of the flat panel display elements when the panel housing is folded, wherein the cover means is formed of flexible sheet, one end of which is fixed inside a first portion of the panel housing and the other end of which is mounted on a second portion of the panel housing with an elastic member interposed; and
the cover means is operated to a location where the cover means does not cover the adjacent sidewalls of the flat panel display elements when the panel housing is unfolded.

* * * * *